(12) United States Patent
Oxholm et al.

(10) Patent No.: US 10,872,637 B2
(45) Date of Patent: Dec. 22, 2020

(54) VIDEO INPAINTING VIA USER-PROVIDED REFERENCE FRAME

(71) Applicant: Adobe Inc., San Jose, CA (US)

(72) Inventors: Geoffrey Oxholm, Albany, CA (US); Seth Walker, Oakland, CA (US); Ramiz Sheikh, San Francisco, CA (US); Oliver Wang, Seattle, WA (US); John Nelson, Seattle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/585,433

(22) Filed: Sep. 27, 2019

(65) Prior Publication Data

US 2020/0118594 A1    Apr. 16, 2020

Related U.S. Application Data

(60) Provisional application No. 62/745,260, filed on Oct. 12, 2018.

(51) Int. Cl.
*G11B 27/036* (2006.01)
*G06T 7/215* (2017.01)
(Continued)

(52) U.S. Cl.
CPC ............ *G11B 27/036* (2013.01); *G06T 5/005* (2013.01); *G06T 7/11* (2017.01); *G06T 7/215* (2017.01);
(Continued)

(58) Field of Classification Search
USPC .................................................. 386/278–290
See application file for complete search history.

(56) References Cited

U.S. PATENT DOCUMENTS 6,667,774 B2    12/2003    Berman et al.
9,741,144 B2     8/2017    Paris et al.
(Continued)

FOREIGN PATENT DOCUMENTS

EP    2608148    6/2013

OTHER PUBLICATIONS

Huang, Jia-Bin, et al., "Temporally Coherent Completion of Dynamic Video", ACM Transactions on Graphics, vol. 35, Issue 6, Article No. 196, Nov. 2016, 11 pages.
Wexler, Yonatan., et al., "Space-Time Video Completion", IEEE Transactions on Pattern Analysis and Machine Intelligence, vol. 29, Issue 3, Mar. 2007, 8 pages.
Adobe, "Project Cloak: Content-Aware Fill for Video", https://www.youtube.com/watch?v=Po-TLPnlrIU, Nov. 10, 2017, accessed Apr. 9, 2019, 18 pages.
(Continued)

*Primary Examiner* — Hung Q Dang
(74) *Attorney, Agent, or Firm* — Kilpatrick Townsend & Stockton LLP

(57) ABSTRACT

Certain aspects involve video inpainting in which content is propagated from a user-provided reference frame to other video frames depicting a scene. For example, a computing system accesses a set of video frames with annotations identifying a target region to be modified. The computing system determines a motion of the target region's boundary across the set of video frames, and also interpolates pixel motion within the target region across the set of video frames. The computing system also inserts, responsive to user input, a reference frame into the set of video frames. The reference frame can include reference color data from a user-specified modification to the target region. The computing system can use the reference color data and the interpolated motion to update color data in the target region across set of video frames.

20 Claims, 12 Drawing Sheets

(51) Int. Cl.
*G06T 7/11* (2017.01)
*G06T 5/00* (2006.01)
*G06T 11/00* (2006.01)
*G06T 11/60* (2006.01)
*H04N 9/873* (2006.01)
*H04N 5/272* (2006.01)
*G06T 7/269* (2017.01)
*H04N 5/265* (2006.01)
*H04N 21/44* (2011.01)
*H04N 21/4728* (2011.01)
*H04N 21/472* (2011.01)
*H04N 21/485* (2011.01)
*H04N 21/8547* (2011.01)

(52) U.S. Cl.
CPC ............ *G06T 11/001* (2013.01); *G06T 11/60* (2013.01); *H04N 5/272* (2013.01); *H04N 9/873* (2013.01)

(56) References Cited

U.S. PATENT DOCUMENTS

| | | | |
|---|---|---|---|
| 9,892,537 | B2 | 2/2018 | Paris et al. |
| 10,049,435 | B2 | 8/2018 | Paris et al. |
| 10,534,525 | B1* | 1/2020 | Suchland ........... H04N 21/2743 |
| 2006/0257042 | A1 | 11/2006 | Ofek et al. |
| 2008/0112642 | A1* | 5/2008 | Matsushita ............... G06T 5/20 382/275 |
| 2016/0111129 | A1* | 4/2016 | Crivelli .............. G06K 9/00744 386/282 |
| 2017/0228875 | A1 | 8/2017 | Nash et al. |

OTHER PUBLICATIONS

Kunz, Meredith Alexander, Adobe Research, "Cloak: Remove Unwanted Objects in Video", https://research.adobe.com/news/cloak-remove-unwanted-objects-in-video, Dec. 11, 2017, accessed Apr. 9, 2019.
Adobe Blog, Adobe Communication Team "Peek Behind the Sneaks: #Project Cloak—Filmmakers Gain the Power of Invisibility", https://theblog.adobe.com/peek-behind-sneaks-filmmakers-gain-power-invisibility/, Jan. 10, 2018, accessed on Apr. 9, 2019, 4 pages.
Mocha Pro, Mocha Pro: Object Removal & Clean Plating, https://www.youtube.com/watch?v=_OUxcFHGOb8, Feb. 13, 2018, accessed Sep. 27, 2019, 27 pages.
Xu, Rui, et al., "Deep Flow-Guided Video Inpainting," https://nbci.github.io/video-inpainting.html, ,2019 4 pages.
Zhang, Richard, et al., "Colorful Image Colorization," arXiv: 08511v5, Oct. 5, 2016, 29 pages.
Yu, Jiahui, et al., "Generative Image Inpainting with Contextual Attention," arXiv:1801.07892v2, Mar. 21, 2018, 15 pages.
Yu, Jiahui, et al.,"Free-Form Image Inpainting with Gated Convulution," arXiv:1806.03589v2, Oct. 22, 2019, 17 pages.
Xu, Rui, et al., "Deep Flow-Guided Video Inpainting," Conference on Computer Vision and Pattern , IEEE, May 2019, 10 pages.
Search and Examination Report from related Great Britain Application GB1911506.2, dated Feb. 19, 2020, 7 pages.
Non Final Office Action from related U.S. Appl. No. 16/378,906 dated Oct. 28, 2020, 20 pages.
Gao, Chen, et al., "Flow-edge Guided Video Completion", http://chengao.vision/FGVC/files/FGVC.pdf, European Conference on Computer Vision, 2020, 17 pages.

* cited by examiner

VIDEO INPAINTING VIA USER-PROVIDED REFERENCE FRAME

CROSS REFERENCE TO RELATED APPLICATIONS

This disclosure claims priority to U.S. Provisional Application No. 62/745,260, filed on Oct. 12, 2018, which is hereby incorporated in its entirety by this reference.

TECHNICAL FIELD

This disclosure relates generally to automated processing of video content for video playback systems. More specifically, but not by way of limitation, this disclosure relates to video inpainting in which content is propagated from a user-provided reference frame to other video frames depicting a scene.

BACKGROUND

Certain video editing programs include features for replacing content in a target region with other desired content, such as user-provided content or content that is copied or derived from other regions in the video. As one example, video inpainting methods are used to fill user-specified, spatiotemporal holes in a video with content that is generated using remaining parts of the video, user input, or data-driven methods trained on other visual content. Video inpainting is used for different applications, such as, but not limited to, unwanted object removal, video stabilization, logo or watermark removal in broadcast videos, and restoration of damaged film content, etc.

SUMMARY

Certain aspects involve video inpainting in which content is propagated from a user-provided reference frame to other video frames depicting a scene. For instance, a computing system can access a set of video frames that includes a first frame and a second frame having respective annotations identifying a target region to be modified. The computing system a boundary motion for a boundary of the target region within the set of video frames. The computing system can interpolate, from this boundary motion, a motion of pixels within the target region across the set of video frames. The computing system can also insert, responsive to user input, a reference frame into the set of video frames. The reference frame can include reference color data from a user-specified modification to the target region. The computing system can use the reference frame to update color data of the target region in the set of video frames to correspond to the target motion interpolated from the boundary motion. For instance, the computing system can update color data of the target region in the first frame with the reference color data from the reference frame, can update second color data of the target region in the second frame with updated color data from the first frame, etc.

These illustrative examples are mentioned not to limit or define the disclosure, but to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

Figure 1:
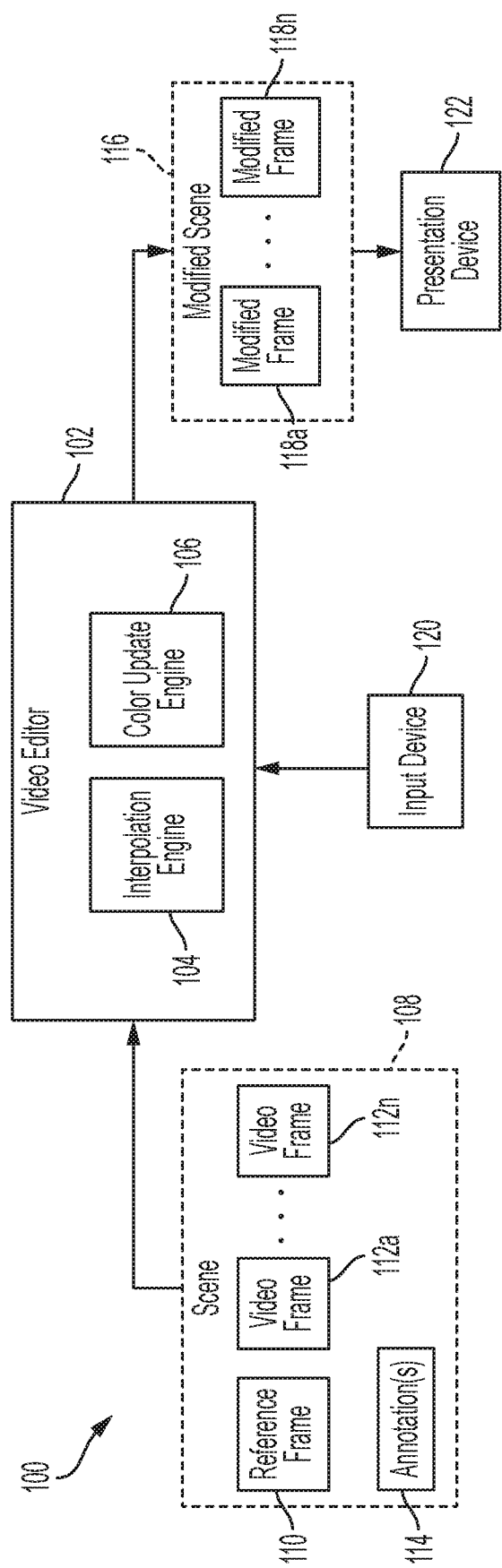
FIG. 1 depicts an example of a video processing environment for video inpainting in which content is propagated from a user-provided reference frame to other video frames depicting a scene, according to certain aspects of this disclosure.

Certain aspects involve video inpainting in which content is propagated from a user-provided reference frame to other video frames depicting a scene. For instance, a video editor assists with modifying a target region of a video, which includes portions of video frames depicting an object to be removed or modified, by using the computed motion of a scene depicted in the video to identify content to be copied into the target region. Such a computation of scene motion includes estimating, prior to modifying the target region, what the motion of the scene would be within the target region based on the motion of other pixels in the scene, such as the motion of boundary pixels defining a boundary of the target region. The video editor can use a reference frame, which a user has modified to include the user's desired content in the target region, to update the target region in the set of video frames.

The following non-limiting example is provided to introduce certain aspects. In this example, a video editor accesses a set of video frames, such as an input video being modified by a user with the video editor, that depict a scene. For instance, a depicted scene includes a football game in progress as well as a spectator that disrupts the view of the football game by walking in front of the camera. The set of video frames includes (or is otherwise associated with) an annotation identifying a target region to be modified in one or more video frames comprising the scene. For instance, the video editor could receive user inputs that identify the spectator object in one or more video frames. The video editor could use these inputs to annotate the spectator object in the set of video frames that comprise the scene.

Continuing with this example, the video editor can, for example, identify a reference frame that has been provided to the video editor via one or more user inputs. The reference frame can include one or more reference objects that have been created, with user input, in the target region. These reference objects are generated by applying the user-specified modification to the target region. For instance, in the scene of a football game described above, the video frames may not include any depiction of a certain portion of the football field, such as the fifty-yard line, because the spectator was between the camera and that portion of the football field for all frames captured by the camera. The video editor can include functionality that allows a user to create or upload a reference frame that has been edited to include the fifty-yard line of the football field. For instance, the video editor can receive, via an editing interface, a set of inputs that recreates the fifty-yard line by mirroring other, similar portions of the football field depicted in the scene (e.g., the thirty-yard line) and refining specific details (e.g., changing a depiction of a "3" to a "5"). In this manner, a user can instruct the video editor to apply a user-specified modification (i.e., the depiction of the fifty-yard line in the target region) to one of the video frames of a scene being edited with the video editor.

The video editor can use an estimated motion of the scene to propagate reference color data from this reference frame to other video frames in the scene. For instance, the video editor can compute a boundary motion for a boundary of the target region within the scene. The boundary can include boundary pixels neighboring the target region (e.g., the "spectator" object) in a set of video frames. The boundary motion indicates how video content along the boundary moves within the scene as the video frames progress. If the scene depicts the football game behind the spectator, the various objects that comprise the football game (e.g., the field, the players, etc.) could move within the scene due to the movement of the objects themselves when captured (e.g., a player running down the field), the movement of the camera (e.g., due to the camera panning from one end of the field to the other), changing the zoom on the camera, or some combination thereof.

To remove the "spectator" object in this example, the video editor estimates the motion within the target region. Estimating the motion includes interpolating, from the boundary motion computed for the boundary pixels, target motion within the target region. Thus, the estimated motion within the target region is a function of the combined computations of motion for boundary pixels. The video editor uses the interpolated motion to update color data of target pixels within the target region. Updating color data of target pixels within the target region can include updating the target region in a first video frame in accordance with reference color data from the reference frame, and then propagating this change from the first video frame to a second video frame, from the second video frame to a third video frame, and so on.

As a simplified example, the reference frame can depict a "fifty-yard line" object rather than the "spectator" object that disrupts the scene in other video frames. The target region for "spectator" object itself includes boundary pixels that follow a path from a first frame to a second frame. The video editor can interpolate, from the path followed by the boundary pixels, a similar path that would occur for an object that the user wishes to insert inside the target region (e.g., the path of the "fifty-yard line" object). The interpolated motion within the target region allows the video editor to estimate where the "fifty-yard line" object would be within the target region, i.e., trace the pixels depicting the "fifty-yard line" object from the reference frame to expected positions in other frames of the scene.

The video editor can therefore copy reference color data of the pixels depicting the "fifty-yard line" object from the reference frame to a first frame that has the target region annotated. In some cases, the video editor can modify the copied color data for consistency with color data outside the target region. For instance, if the reference frame depicts a scene (and the "fifty-yard line" object) from a view at one angle and the first frame depicts the scene from a slightly different view at a different angle, the video editor can modify the copied version of the "fifty-yard line" object so that the "fifty-yard line" object appears to be captured from the same view as the rest of the scene in the first frame. The video editor can replicate this process for subsequent video frames. For instance, the video editor can copy color data of the "fifty-yard line" object from the first frame to the target region a second frame, and modify the "fifty-yard line" object in the second frame for consistency with other color data outside the target region in the second frame. Similarly, the video editor can copy the "fifty-yard line" object from the second frame to a third frame and perform any necessary modifications. The video editor can continue this process for other frames depicting the scene, thereby replacing the disruptive "spectator" object in the video with a user-created "fifty-yard line" object.

As described herein, certain aspects provide improvements to computing systems used for editing video content. For instance, existing video inpainting techniques can, for example, filling a selected portion of frame (e.g., a hole where an object was removed) with content sampled from other parts of the frame. But for frames that depict more complex objects (e.g., a hole in the middle of an object with detailed features or large variation in color), these automated techniques can introduce inaccuracies in the filled-in region, and propagating this inaccurately filled-in region across a video leads to accumulation of error. By contrast, certain aspects described herein can reduce the amount of error in a video inpainting process. For instance, by inserting a user-specified reference frame into one or more locations in a sequence of frames, a more accurate version of such a filled-in region can be used as the basis for an automated video inpainting process in other frames of the video. Consequently, the color information propagated from the filled-in region to other frames can more realistically depict a desired scene (i.e., a scene in which a target object has been removed). Thus, aspects described herein improve computer-implemented processes performed by video-editing tools.

Example of an Operating Environment for Video Inpainting via User-Provided Reference Frames Referring now to the drawings, FIG. 1 depicts an example of a video editing environment 100 for performing video inpainting with user-provided reference frames. Video inpainting methods can involve filling user-specified target regions in a video with content from other parts of the video, content provided via user input, or content generated via data-driven methods trained on other visual content. The video editing environment 100 includes a set of communicatively coupled components. These components include a video editor 102 that can be executed on one or more computing devices, an input device 120 that can be used to provide commands to the video editor 102, and a presentation device 122 that displays video content to a user.

The video editor 102 includes program code for displaying and editing video content. For instance, the video editor 102 can include program code for rendering content for display, program code for creating one or more instances of event listeners or other suitable objects for receiving input from input devices (e.g., a mouse, a touchscreen, etc.), and program code for modifying color information for pixels in one or more frames of video content, etc.

In the example depicted in FIG. 1, the video editor includes an interpolation engine 104 and a color update engine 106. The interpolation engine 104 includes program code that, when executed by processing hardware, performs one or more operations for estimating the motion of pixels bordering a user-specified area of interest across a set of video frames. The interpolation engine 104 includes program code that, when executed by processing hardware, performs one or more operations for estimating the motion of pixels within the user-specified area of interest across a set of video frames 112a-n. The color update engine 106 includes program code that, when executed by processing hardware, performs one or more operations for modifying color information within the user-specified area of interest based on the estimated motion.

While FIG. 1 depicts a video editor 102 that includes an interpolation engine 104 and a color update engine 106, other implementations are possible. For instance, in various aspects, one or more of these engines can be omitted, the functionality of these engines can be combined into a single software engine, or one or more of these engines can be included in software that is separate from and in communication with the video editor 102.

The video editor 102 is used to remove or modify one or more objects or other features in video content using one or more user-provided reference frames 110. (An example of the object modification is discussed below with respect to FIG. 2, and an example of using motion information is discussed below with respect to FIGS. 3-7) Video content could include, for example, a sequence of video frames 112a through 112n. The sequence of video frames can collectively comprise a scene 108. Examples of removing or modify objects or other features include removing people or large objects (for color grading, or producing three-dimensional films), removing dark areas in the video resulting from dust on a lens of a camera, removing unwanted objects (trash, accidental set element), removing logos (for stock video or commercialization), removing distractors (labels, reflecting lights, etc.), changing appearance of something in a video by modifying only one frame or a small set of frames, etc.

In an illustrative example, the video editor 102 fills a target region, such as a whole region, in a set of video frames. A hole region can be a contiguous collection of pixels in the image that are transparent or semi-transparent. In this example, the video editor 102 receives, from the input device 120, user input that adds one or more annotations 114 to the video frames 112a-112n. An annotation 114 is data that is included in or associated with video content to identify the area of interest in the set of video frames 112a-112n. In one example, the user inputs include drawing a rough mask or rotoscoping on one or more frames, where the one or more objects indicated by the mask are tracked over a sequence of frames (i.e., over time).

Continuing with this example, the video editor 102 applies, responsive to one or more command inputs received via the input device 120, a video inpainting process to generate or otherwise identify target pixel data (e.g., color information). The target pixel data is used to modify the user-specified area of interest. In particular, the video editor 102 modifies color information of pixels in the area of interest to include the target pixel data.

For instance, the video editor 102 can copy color information from pixels in the reference frame 110 to certain pixels of a video frame 112b. In some aspects, the video editor 102 can modify the copied color information in the video frame 112b so that the appearance of a reference object (i.e., the object comprising reference pixels with the copied color information) in the video frame 112b is consistent with other objects depicted in the first video frame 112b. As a simplified example, the reference frame 110 can depict a scene 108 from a certain viewing angle with certain lighting, whereas the video frame 112b can depict the scene 108 from a different viewing angle with different lighting. Thus, simply copying a reference object (i.e., color information in reference pixels) from the reference frame 110 to the video frame 112b may result in the reference object within video frame 112b having an angle or lighting that differs from the rest of the scene in the video frame 112b. To avoid this result, the video editor 102 can modify the copied color information so that the reference object, as depicted in the video frame 112b, appears from the same viewing angle with the same lighting as other objects in the video frame 112b. The video editor 102 can similarly copy (and, if necessary, update) color information from pixels in the video frame 112b to pixels of a subsequent one of the video frames. (The pixels that are updated in each video frame are identified using estimated motion of a scene, as described in further detail below with respect to FIGS. 3-7.) In this manner, the video editor 102 generates a modified scene 116 having one or more modified frames 118a-118n for display on the presentation device 122.

Figure 2:
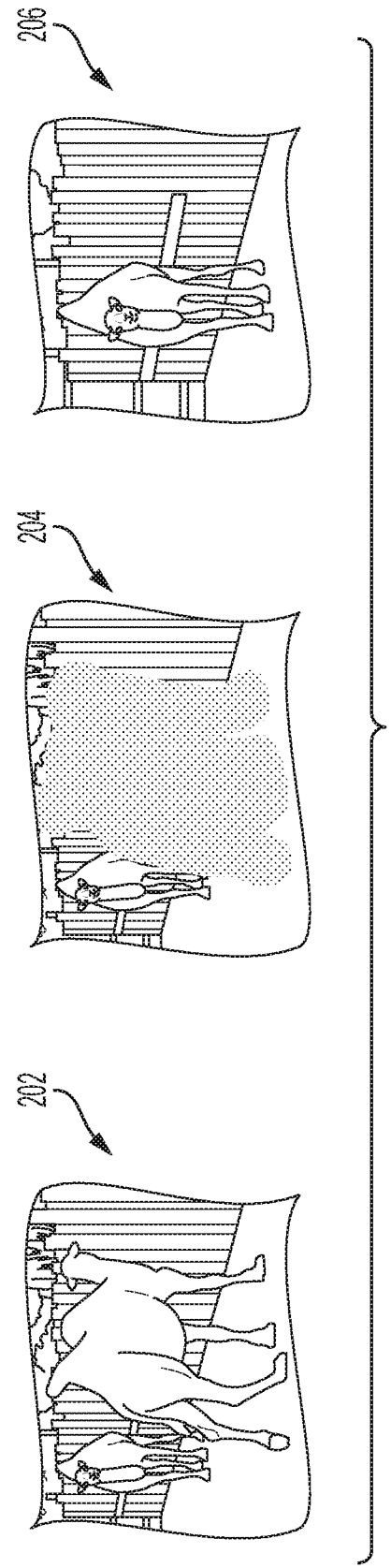
FIG. 2 depicts an example of modifying a video frame to be removed by the video processing environment of FIG. 1 using video inpainting, according to certain aspects of this disclosure.

FIG. 2 depicts an example of using the video editing environment 100 to remove an object from a scene. In this example, the video editor 102 identifies, based on one or more inputs from the input device 120, an object to be removed from the scene. For instance, the video editor 102 or other suitable software could receive a drawing input that selects one or more portions of a camel depicted in the frame 202 from a video. The video editor 102 or other suitable software annotates the frame 202 to specify that the camel identified via the user input should be removed, as indicated by the camel-shaped hole region in the annotated frame 204. The annotation can be a mask or other data that segments a target object from other objects in a frame. In some aspects, the video editor can propagate the identification of an object in one frame of a scene 108 to other frames of the scene 108 (e.g., other frames where the camel to be removed is depicted).

In some aspects, the color update engine 106 performs a pixel-replacement operation or other color-modification operation with respect to the hole region indicated in the annotated frame 204. For instance, the color update engine 106 can identify one or more replacement objects in the scene that are depicted in one or more frames prior to the frame 202, depicted in one or more frames subsequent to the frame 202, or both. In the example from FIG. 1, the reference frame 110 can include at least one of these replacement objects.

In the example of FIG. 2, the color update engine 106 identifies pixels included in the fence object that is depicted in the scene. Frames before or after the frame 202 depict the fence without the camel standing in front of the fence. The interpolation engine 104 computes interpolated motion of the scene depicted in the set of video frames that includes the frame 202. The color update engine 106 can use the interpolated motion to modify the pixel color information in the hole region depicted in frame 204.

For instance, the color update engine 106 can modify pixels within the hole region to have the color information from the identified pixels included in the fence object. By doing so, the color update engine 106 generates a modified frame 206. The modified frame 206 no longer depicts the camel (i.e., the camel has been removed). Furthermore, in the modified frame 206, the hole region 204 has been modified to depict other scene objects that were occluded by the camel and therefore not depicted in frame 202 (e.g., a portion of the fence, a portion of the ground, etc.).

Example of Using Reference Data for Video Inpainting of a Target Region

FIGS. 3-7 depict a simplified example of a video editor 102 being used to modify a target region to include content from a reference frame. In this example, the video editor 102 can estimate motion within a target region using the motion at the boundary of the target region (e.g., a user-specified hole). To do so, the video editor 102 can compute optical-flow motion for each frame in a set of video frames. This computed motion can be used, for example, to remove a certain object from a scene by keeping track of the movement of other objects depicted behind the object to be removed. Keeping track of the movement of these other objects can facilitate updating a target region with color information from suitable pixels (i.e., pixels depicting the other objects in the scene).

Figure 3:
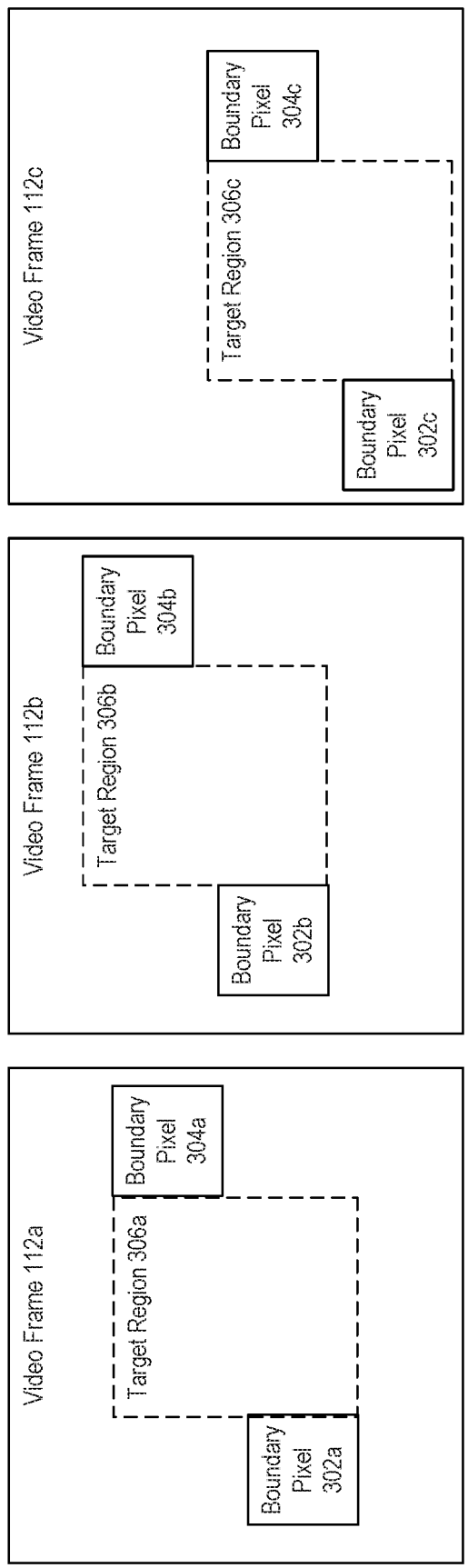
FIG. 3 depicts an example of a reference frame along with video frames having a target region and associated boundary pixels that can be edited with the video processing environment depicted in FIG. 1, according to certain aspects of this disclosure.

In the simplified example of FIGS. 3-7, a video editor 102 accesses a set of video frames 112a-c that are depicted in FIG. 3. Video content, which includes the video frames 112a-c, is annotated to identify a target region. For instance, the target region 306a in the video frame 112a could indicate that a particular object (e.g., the camel of FIG. 2) is to be removed, and the target regions 306b and 306c in the video frames 112b and 112c, respectively, could indicate that the same object, positioned at a different location within the scene as depicted in the video frames 112b and 112c, is to be removed.

The target region is bounded by a set of boundary pixels. In FIG. 3, the boundary includes the boundary pixels 302a and 304a on opposite sides of the target region 306a in video frame 112a. In one example, the boundary pixel 302a could be part of a tree depicted in the frames of FIG. 2, the target region 306a could encompass the target camel depicted in the frames of FIG. 2, and the boundary pixel 304a could be part of a fence depicted in the frames of FIG. 2. Similarly, in the video frame 112b, the boundary includes the boundary pixels 302b and 304b (e.g., pixels from the tree and the fence in FIG. 2 at different locations) on opposite sides of the target region 306b (e.g., the target camel in FIG. 2 at a different location), in the video frame 112b, the boundary includes the boundary pixels 302c and 304c (e.g., pixels from the tree and the fence in FIG. 2 at different locations) on opposite sides of the target region 306c (e.g., the target camel in FIG. 2 at a different location).

Figure 4:
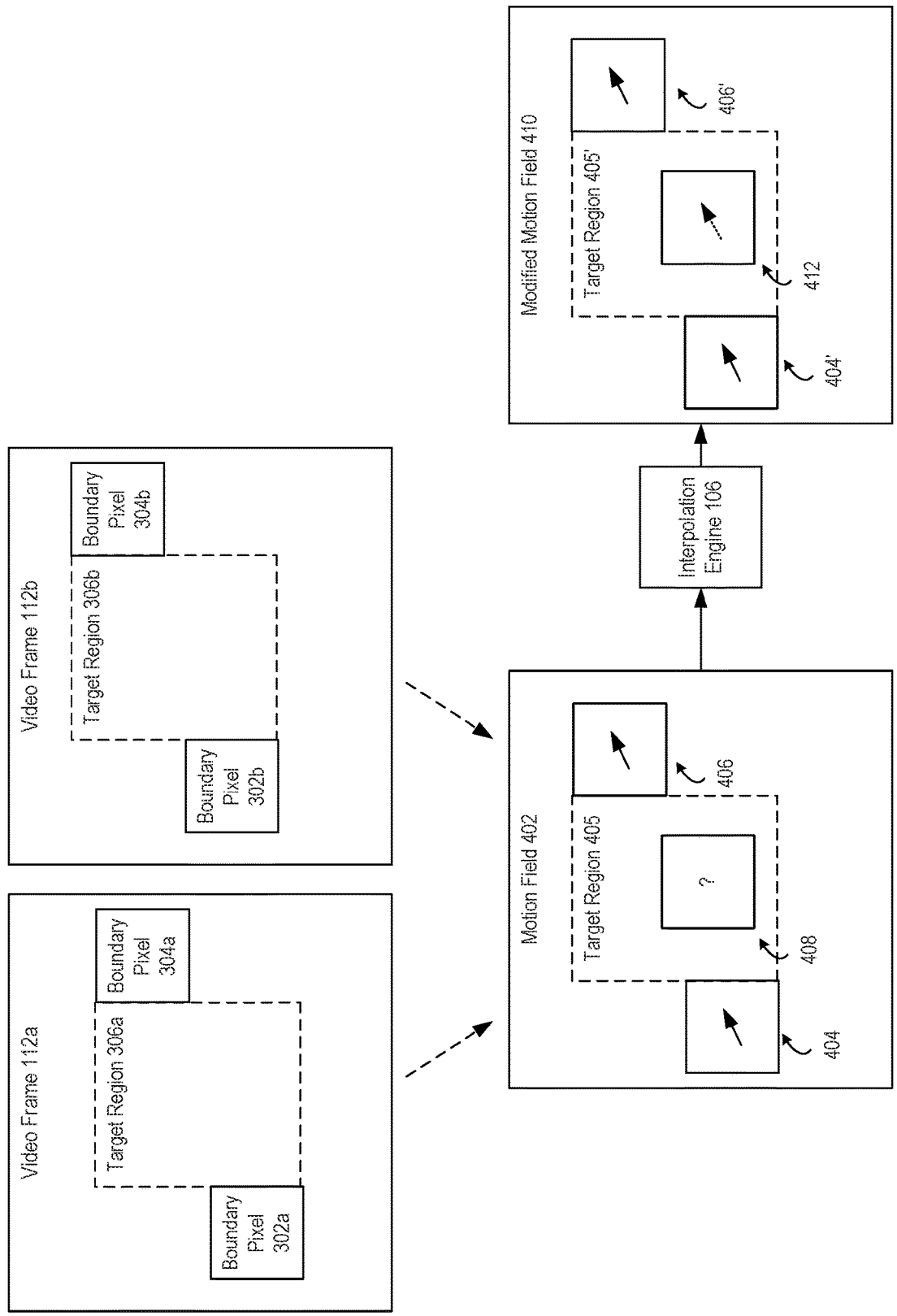
FIG. 4 depicts an example of a first motion field that is computed from a first set of the video frames depicted in FIG. 3, according to certain aspects of this disclosure.

FIG. 4 depicts a simplified example of interpolating motion within a target region based on boundary pixels. In this example, the video editor 102 computes a motion field 402 based on an analysis of the video frame 112a and the video frame 112b. The video editor 102 represents the motion between boundary pixels 302a and 302b as a vector 404. The video editor 102 also represents the motion between boundary pixels 304a and 304b as a vector 406. For illustrative purposes, the vectors 404 and 406 are depicted in FIG. 4 using arrows identifying the directions of movement between boundary pixels 302a and 302b and between boundary pixels 304a and 304b. Furthermore, because the target region 306a identifies a location of a target object to be removed from the video frames 112a and 112b, the motion field 402 is depicted as including an "unknown" motion for a target pixel within the target region 405, where the target region 405 indicates motion for a target object to be removed from the video frame 112a. In this example, the "unknown" motion is an unknown desired motion, i.e., the motion that would have been computed in the target region if the video frames 112a and 112b had been captured without the target object that is to be removed.

The interpolation engine 104 computes, based on the boundary motion, an estimated motion with respect the target region 405. For instance, each boundary pixel is associated with a respective boundary motion represented by a vector, such as the vectors 404 and 406. The interpolation engine 104 uses the collection of vectors (including vectors 404 and 406) to compute an estimated motion for a target pixel within the target region 405. The interpolation engine 104 generates a modified motion field 410 that includes a motion vector 412 for the estimated motion in the target region 405', along with the vectors 404' and 406'. In this example, the target region 405' is the same portion of the modified motion field 410 as compared to the target region 405 in the motion field 402. Similarly, the vectors 404' and 406' in the modified motion field 410 are the same as the vectors 404 and 406 in the motion field 402.

Figure 5:
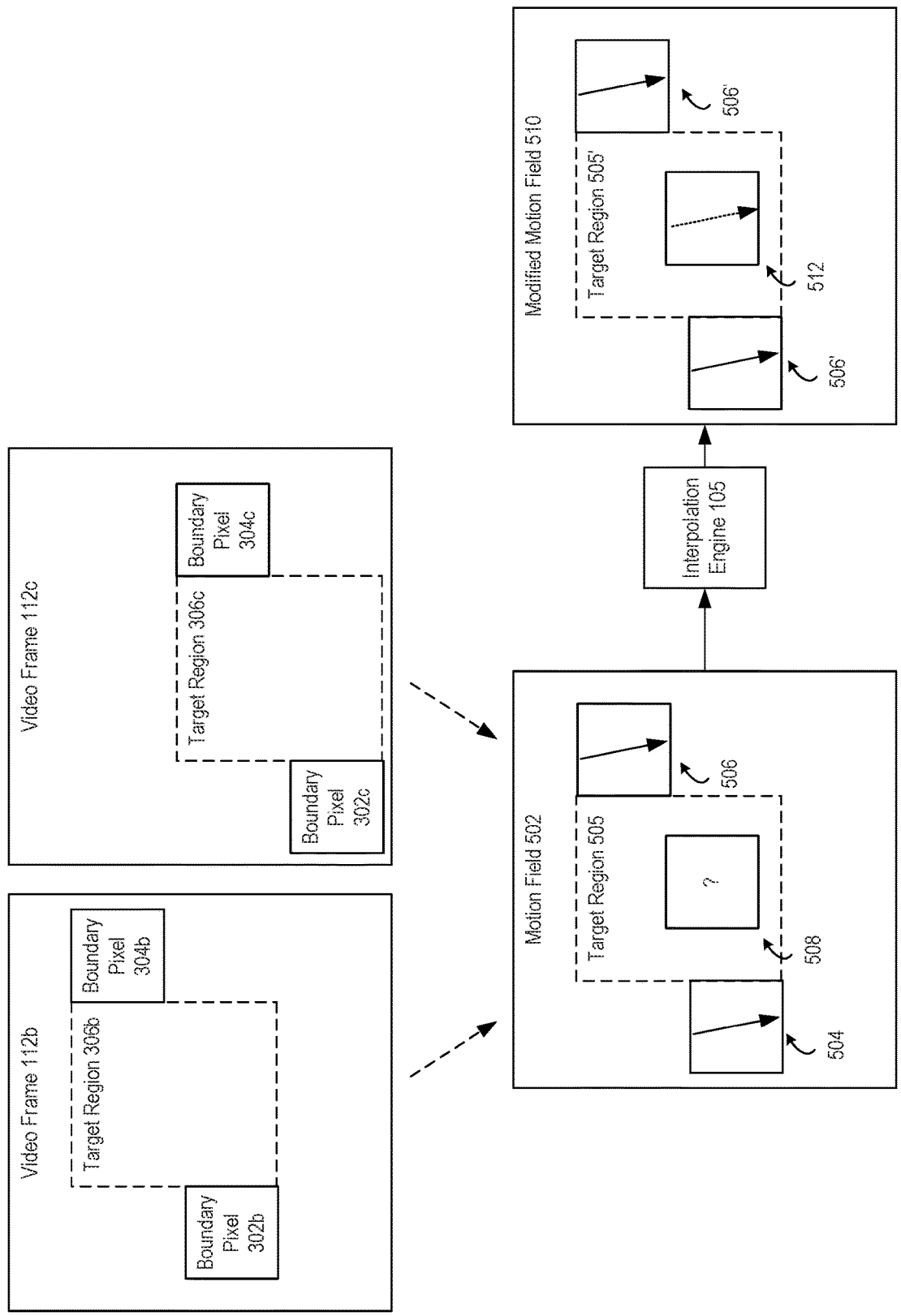
FIG. 5 depicts an example of a second motion field that is computed from a second set of the video frames depicted in FIG. 3, according to certain aspects of this disclosure.

FIG. 5 depicts another example of interpolating motion. In the example depicted in FIG. 5, the video editor 102 computes a motion field 502 based on an analysis of the reference frame 110 and the video frames 112a. Similar to FIG. 4, the video editor 102 represents the motion between boundary pixels 302b and 302c as a vector 504. The video editor 102 also represents the motion between boundary pixels 304b and 304c as a vector 506. For illustrative purposes, the vectors 504 and 506 are depicted in FIG. 5 using arrows identifying the directions of movement between boundary pixels 302b and 302c and between boundary pixels 304b and 304c. Furthermore, similar to FIG. 4, the motion field 502 is depicted as including an "unknown" motion for a target pixel within a target region 505, where the target region 505 indicates motion for a target object to be removed from the video frame 112b.

The interpolation engine 104 computes, based on the boundary motion, an estimated motion with respect the target region 505. For instance, each boundary pixel is associated with a respective boundary motion represented by a vector, such as the vectors 504 and 506. The interpolation engine 104 uses the collection of vectors (including vectors 504 and 506) to compute an estimated motion for a target pixel within the target region 505. The interpolation engine 104 generates a modified motion field 510 that includes a motion vector 512 for the estimated motion in the target region 505', along with the vectors 504' and 506'. In this example, the target region 505' is the same portion of the modified motion field 510 as compared to the target region 505 in the motion field 502. Similarly, the vectors 504' and 506' in the modified motion field 510 are the same as the vectors 504 and 506 in the motion field 502.

Continuing with this example, the video editor 102 can use the estimated motion illustrated in FIGS. 4 and 5 to trace, through time, paths of pixels (or, more specifically, objects comprised by the pixels) between locations outside the target region to locations inside the target region. Doing so allows the video editor 102 to identify or determine the appearance of these pixels using video frames in which the pixels are not in the target region.

Figure 6:
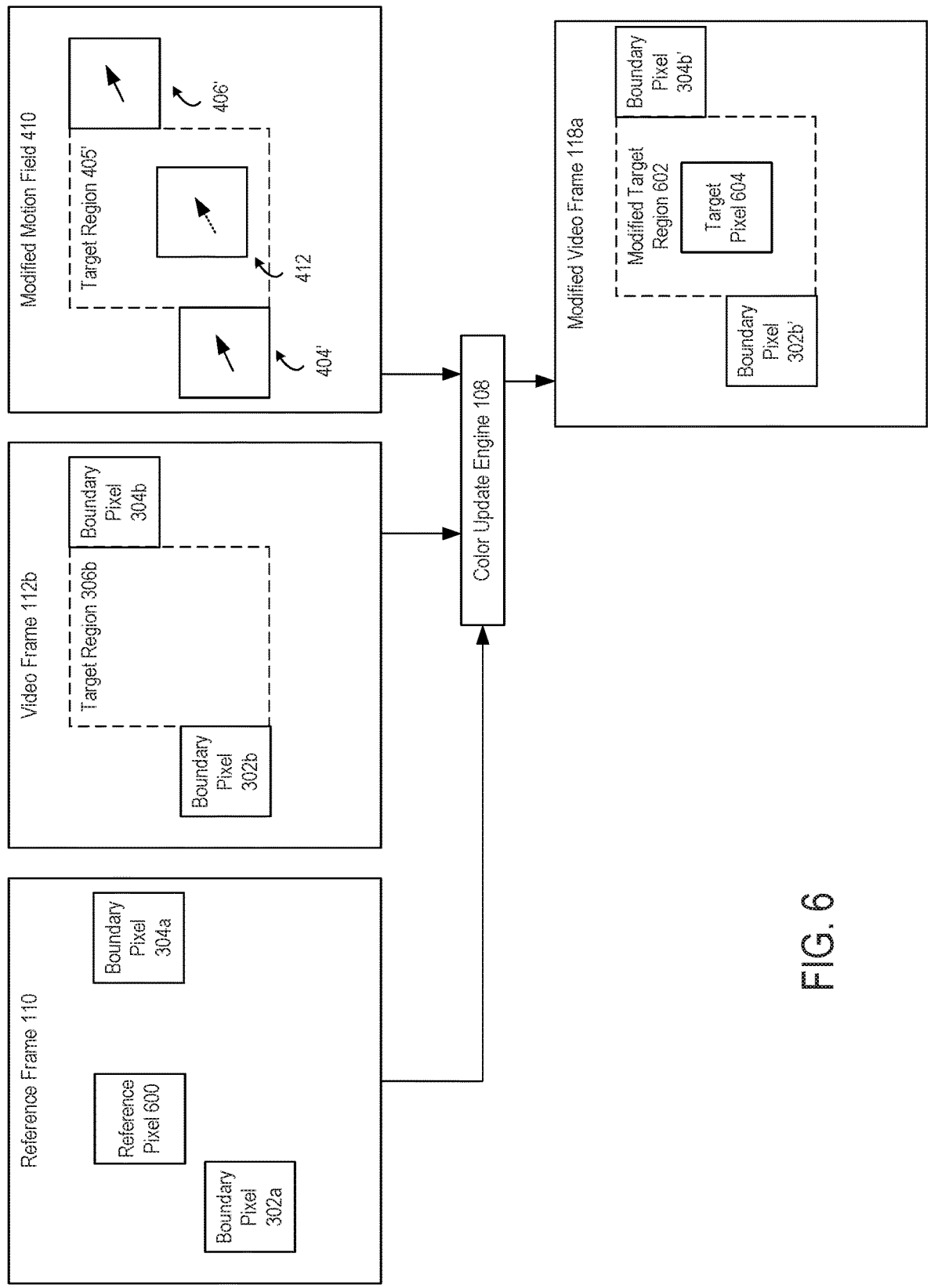
FIG. 6 depicts an example of generating a modified video frame using the reference frame of FIG. 3 and the interpolated motion from the motion field from FIG. 4, according to certain aspects of this disclosure.

For instance, FIG. 6 depicts a simplified example of modifying color information of a target pixel within a target region based on an estimated motion computed by the interpolation engine 104. In this example, the video editor 102 has been used to replace the video frame 112a with a reference frame 110. The reference frame 110 has some of the same content as the video frame 112a, such as boundary pixels 302a and 302b. But the reference frame 110 also includes one or more reference objects comprising reference pixels, where the reference objects have been created in the reference frame 110 via one or more user inputs. In this example, a reference pixel 600 is one of these reference pixels included in a reference object.

The color update engine 106 accesses the reference frame 110, the video frame 112b, and the modified motion field 410. The color update engine "traces" the path of a reference pixel 600 from a location in the reference frame 110 to a location within the target region 306a as depicted in the video frame 112b. Using the example of FIG. 2, a "traced" pixel could be a portion of a "brown fence" object that is occluded by the target camel object in the video frames 112a and 112b, but that a user has added to one or more reference frames 110. (An example of creating such a reference object is described herein with respect to FIGS. 9-11.)

A reference frame could be sequenced before one or more of the video frames 112a and 112b, sequenced after one or more of the video frames 112a and 112b, or both. In a simplified example, a pixel located at position (3, 1) in a reference frame could have a brown color, i.e., be a part of the "brown fence" object. The motion vector 412 indicates the motion through the target region that would have been associated with the "brown fence" pixel if the "brown fence" object had not been occluded by target "camel" object in the frames 112a and 112b. For instance, the motion vector 412 for this "fence" pixel could indicate a motion of one pixel up and three pixels right. The color update engine 106 can therefore determine that, in the absence of the occlusion by the "camel" object, the "fence" pixel would have been located in the target region of the video frame 112b at position (4, 4) (i.e., one pixel up and three pixels right from the (3,1) location).

The color update engine 106 therefore copies color information from the pixel located at position (3,1) in the reference frame (i.e., the "fence" pixel) to generate a target pixel 604 located at position (1,4) in the modified video frame 110a. (In this illustrative example, the modified video frame 110a also includes boundary pixels 302b' and 304b' that have the same color information as the boundary pixels 302b and 304b, respectively, from the video frame 112b.) In some aspects, the target pixel 604 can have identical color information as compared to the reference pixel 600. In additional or alternative aspects, the video editor 102 can modify the color information obtained from the reference pixel 600 when generating the target pixel 604. For instance, if the appearance of a reference object (i.e., the "brown fence" object) would change from the reference frame 110 to the video frame 112b (e.g., due to changes in view angle, lighting conditions, etc.), the color update engine 106 can modify color information of pixels used to depict that reference object in the modified video frame 110a. In one example, a scene as depicted in the reference frame 110 may include brighter colors to depict more light, whereas a modified version of the scene as depicted in the video frame 112b may include darker versions of the same colors to depict a reduction in light. The color update engine 106 can account for this change in depicted lighting conditions by, for example, decreasing a luminance value in the color information obtained from the reference pixel 600 and recoloring the target pixel 604 using this decreased luminance value.

Figure 7:
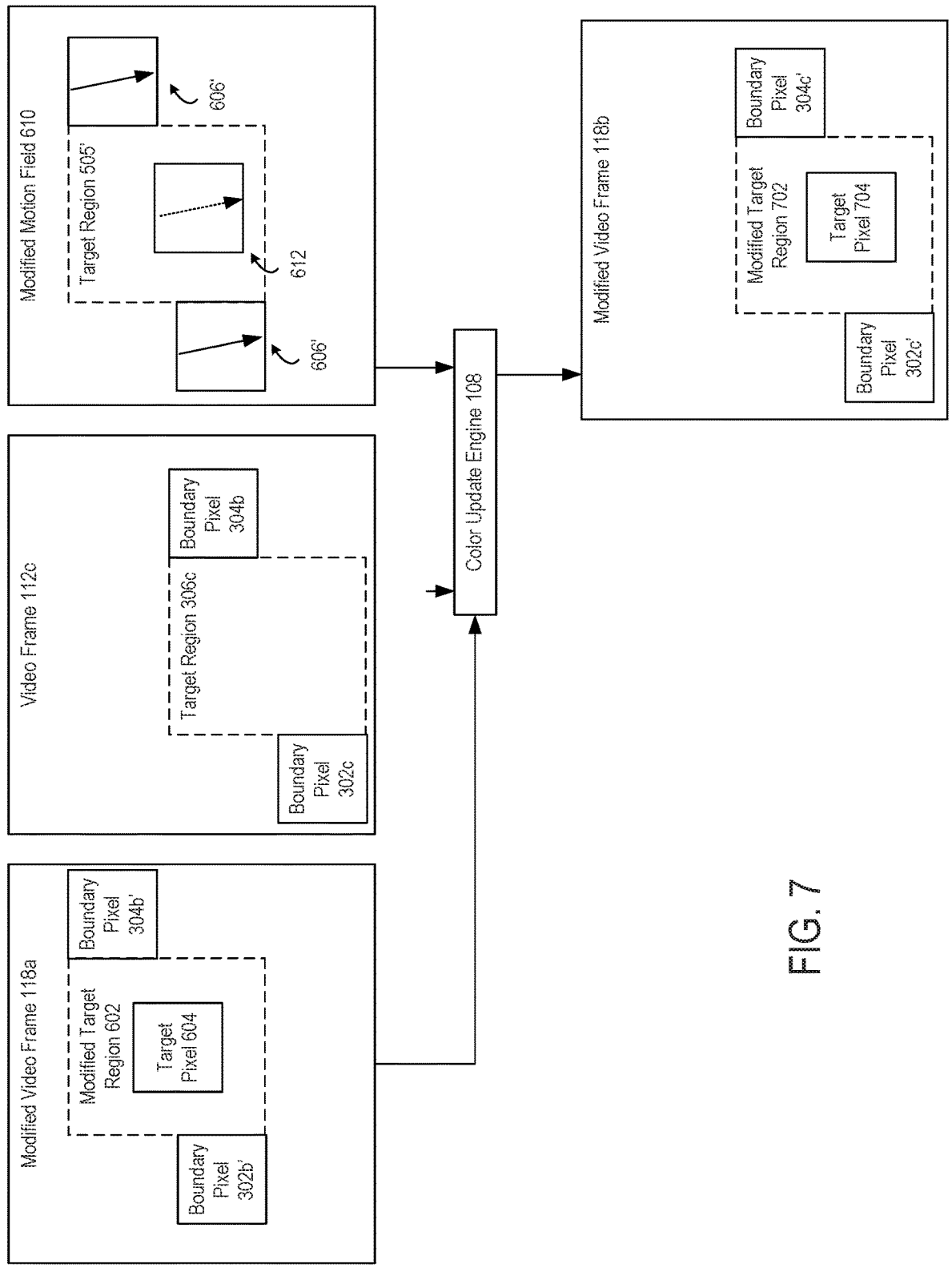
FIG. 7 depicts an example of generating another modified video frame using the modified video frame of FIG. 5 and the interpolated motion from the motion field from FIG. 6, according to certain aspects of this disclosure.

FIG. 7 depicts a simplified example of propagating color information generated with a reference frame to one or more additional video frames. In this example, the color update engine 106 accesses the modified video frame 118a, the video frame 112c, and the modified motion field 610. The color update engine "traces" the path of a target pixel 604 from a location in the modified video frame 118a to a location within the target region 306c of the video frame 112c. The color update engine 106 copies color information from the target pixel 604 in the modified video frame 118 to generate a target pixel 704 in the modified video frame 118b. (In this illustrative example, the modified video frame 118b also includes boundary pixels 302c' and 304c' that have the same color information as the boundary pixels 302c and 304c, respectively, from the video frame 112b.) In various aspects, similar to the example of FIG. 6, the target pixel 704 can have identical color information as compared to the target pixel 604, or the video editor 102 can modify the color information obtained from the target pixel 604 when generating the target pixel 704. For instance, if the appearance of a reference object (i.e., the "brown fence" object) would change from the modified video frame 118a to the video frame 112c (e.g., due to changes in view angle, lighting conditions, etc.), the color update engine 106 can modify color information of pixels used to depict that reference object in the modified video frame 118b.

Example of a Process for Video Inpainting with a User-Provided Reference Frame

Figure 8:
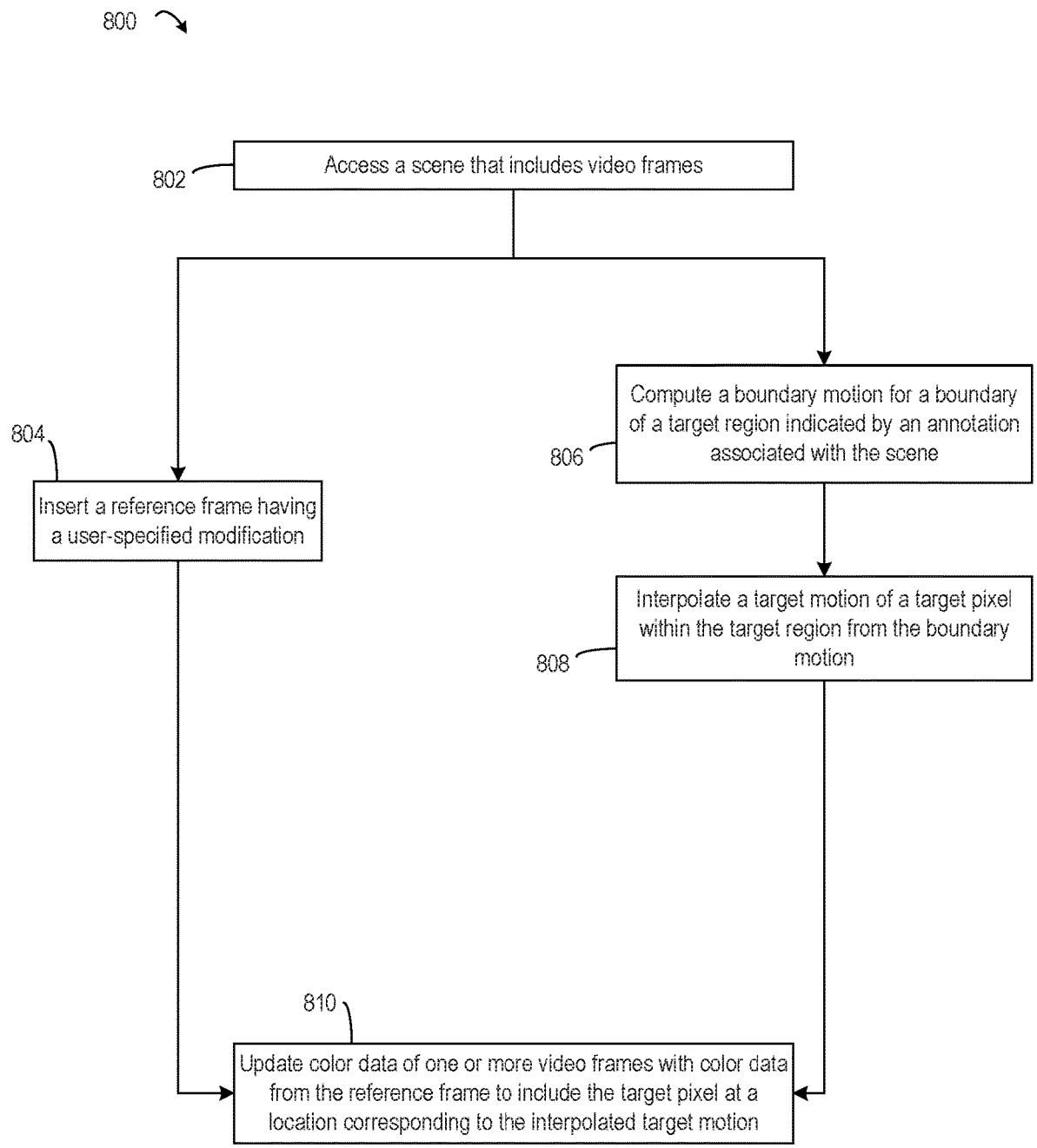
FIG. 8 depicts an example of a process for performing video inpainting with a user-provided reference frame, according to certain aspects of this disclosure.

FIG. 8 depicts an example of a process 800 for performing for video inpainting with a user-provided reference frame. One or more operations described with respect to FIG. 8 can be used to implement a step for updating video content in a target region based on a user-provided reference frame. In some aspects, one or more computing devices implement operations depicted in FIG. 8 by executing suitable program code (e.g., the video editor 102, one or more of the engines depicted in FIG. 1, etc.). For illustrative purposes, the process 800 is described with reference to certain examples depicted in the figures. Other implementations, however, are possible.

At block 802, the process 800 involves accessing a scene that includes video frames. For instance, the video editor 102 can access video content from a data storage unit. The data storage unit can be located on one or more memory devices available over a data network, one or more memory devices connected to a data bus on a computing device that executes the video editor 102, or some combination thereof.

In one example, the video editor 102 accesses video content having one or more annotated target regions. Examples of an annotated target region include a hole generated by one or more erasure inputs received via the input device 120, a particular target object to be replaced (e.g., the camel depicted in FIG. 2) that is identified by one or more selection inputs received via the input device 120 as a particular target object to be modified (e.g., modifying the appearance of a target object rather than removing it) that is identified by one or more selection inputs received via the input device 120, a dark area in the scene generated by dust on the lens of a camera used to capture the scene, or a shadow to be removed. The video editor 102 can be used to modify some or all pixels in the hole with color values. For instance, if an object is to be removed or a hole to be filled, the video editor 102 can be used to modify target pixels in the target region to have color information that would have resulted from capturing the scene without the object.

At block 804, the process 800 involves inserting a reference frame having a user-specified modification. The video editor 102 can, for example, identify a reference frame 110 that has been provided to the video editor 102 via one or more user inputs. The reference frame 110 can include one or more reference objects that have been created, with user input, in the target region. These user-specified modification to the target region can include creating these reference objects. A reference object is comprised of pixels (e.g., a reference pixel 600) that include reference color data. As described below, the video editor 102 modifies the target region in one or more other video frames to include the reference color data from the reference frame. One or more examples of inserting a reference frame are described herein with respect to FIGS. 9-11.

At block 806, the process 800 involves computing a boundary motion for a boundary of a target region indicated by an annotation associated with the scene. The video editor 102 can compute an optical flow with respect to a set of video frames that collectively depict a scene. For instance, the video frames can be included in an input video I of height H, width W and number of frames L. The video editor 102 can compute a forward flow U and a backward flow V. To compute the motion between frame n and n+1, the video editor 102 can compute the flow (motion) from time n to time n+1. The forward flow at position (x, y, n) (i.e., a pixel at position (x, y) on a frame at time n) can be represented as U (x, y, n)=(dx, dy, +1), indicating a flow vector (dx, dy) from a point located at (x, y, n) to a point (x+dx,y+dy,n+1) in the video I. The backward flow at position (x,y,n) (i.e., a pixel at position (x, y) on frame n) can be represented as V (x, y, f)=(dx, dy, −1).

In this example, a boundary motion is a motion with respect to one or more pixels that define a boundary of a target region. The boundary can be, for example, the set of pixels that neighbor the union of the hole in a video frame n and a video frame n+1. This set of boundary pixels can include pixels having some commonality with one another that are adjacent to at least one other pixel not sharing the commonality (e.g., two pixels that share at least some color information and that have no common color information with respect to an adjacent pixel in the target region).

At block 808, the process 800 involves interpolating a target motion of a target pixel within the target region from the boundary motion. For instance, the interpolation engine 104 generates a modified motion field for a specific video frame (i.e., estimates the motion of a pixel in the target region of a specific frame) as a function of the motion of the boundary pixels at the boundary of the target region.

At block 810, the process 800 involves updating color data of the target pixel with color data from the reference frame to correspond to the target motion interpolated from the boundary motion. For instance, the video editor 102 uses motion fields that have been modified with interpolated target motion of various pixels to trace paths of the pixels from a location within the target region to one or more locations outside the target region. For each pixel inside the target region in a given video frame, the video editor 102 copies (and, in some cases, further updates) the pixel data (e.g., color information) from a corresponding pixel that has been traced to another video frame, as described above with respect to FIGS. 5 and 7. In a simplified example, the color update engine 106 can identify reference color data of the target pixel at a reference location in the reference frame, and can update first color data of the target pixel at a first location in the first frame by replacing the first color data with the reference color data. Replacing the first color data with the reference color data can include copying the reference color data, updating the copied reference color data to reflect one or more changes in the scene from the reference frame to the first frame, and updating the target pixel to have the updated reference color data. Similarly, the color update engine 106 can identify this color data of the target pixel at the first location in the modified first frame, and can update second color data of the target pixel at a second location in the second frame by replacing the second color data with the identified color data of the target pixel in the first frame. Here, replacing the second color data with the identified color data of the target pixel in the first frame can include copying the color data of the target pixel in the first frame, updating the copied color data to reflect one or more changes in the scene from the first frame to the second frame, and updating the target pixel in the second frame to have this updated version of the color data of the target pixel in the first frame.

Updating color data can include any process in which video content, after being edited using the process 800, displays one or more modifications to the target region after playback. In some aspects, updating color data involves modifying an image layer that includes the target object in one or more video frames. In additional or alternative aspects, updating color data involves overlaying one or more image layers with the modified target region and one or more image layers that include the unmodified target object in one or more video frames. In one example, the video editor 102 could create a set of video frames having a mask in the shape of the target region, where pixels outside the target region are set to be transparent and pixels within the target region are set to be opaque. The video editor 102 can update the opaque pixels of this image layer at block 810. The video editor can create a multi-layered set of frames in which the layer having opaque pixels depicting the modified target region and transparent pixels elsewhere is overlaid on a source layer that includes the video content with the unmodified target region. Any number of layers, with different configurations of masks, can be used to generate an output video having the modified target region.

Examples of Interfaces for Providing a Reference Frame to a Video Editor

In some aspects, the video editor 102 includes functionality that allows a user to generate the reference frame 110 within the video editor 102. For instance, the video editor 102 can include program code that, when executed, presents an editing interface. The editing interface can include a preview pane. The preview pane can display a frame from the video frames 112a-112n. The video editor 102 can receive, via the editing interface, one or more editing inputs that modify the frame displayed in the preview pane. In this manner, a user can instruct the video editor 102 to apply a user-specified modification to one of the video frames of a scene being edited with the video editor 102. The video frame to which this user-specified modification is applied is the reference frame. The video editor 102 selects this reference frame at block 804.

Figure 9:
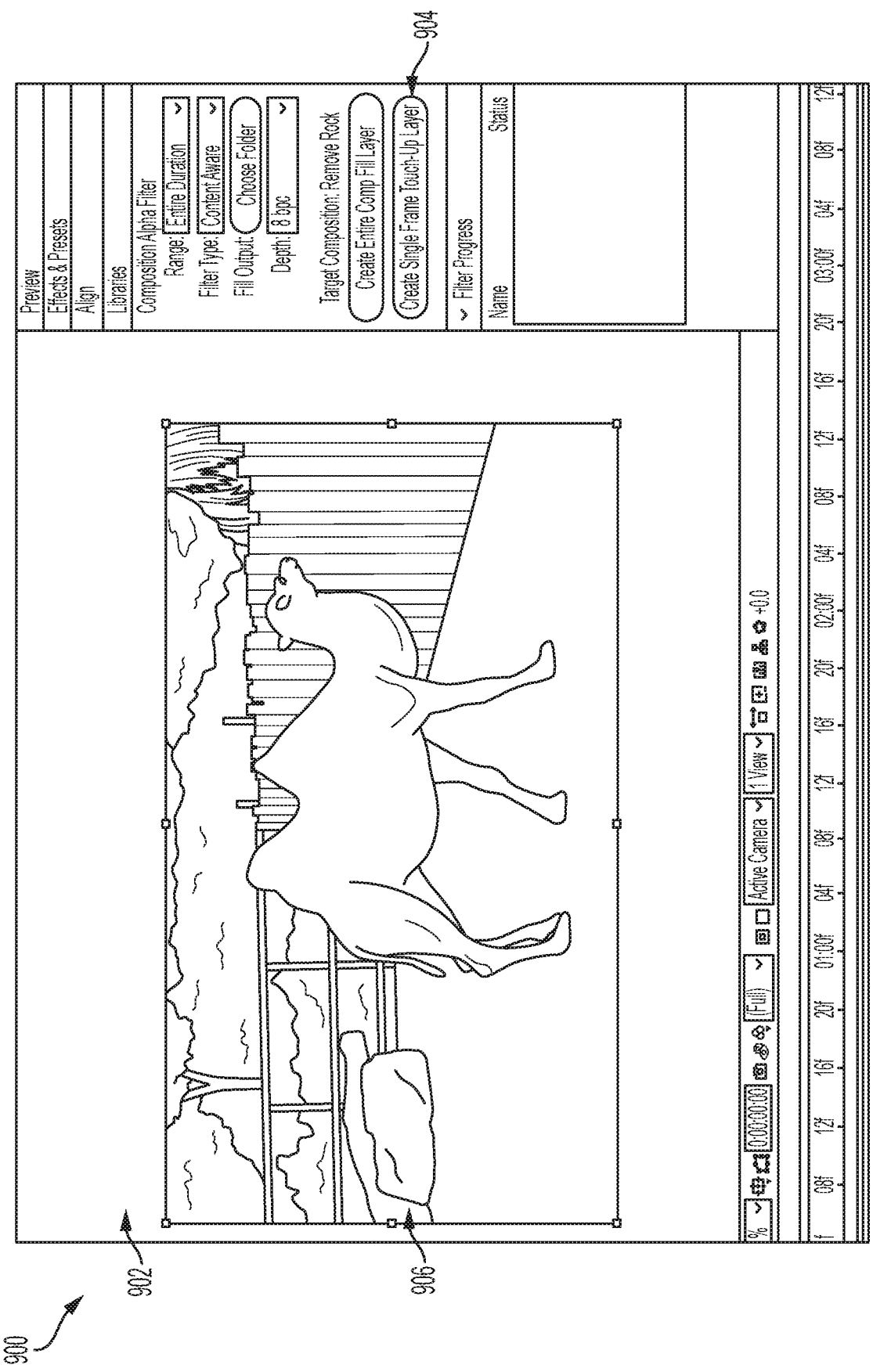
FIG. 9 depicts an example of an interface, which can be used in a video editor depicted in FIG. 1, for performing video inpainting with a user-provided reference frame, according to certain aspects of this disclosure.
Figure 10:
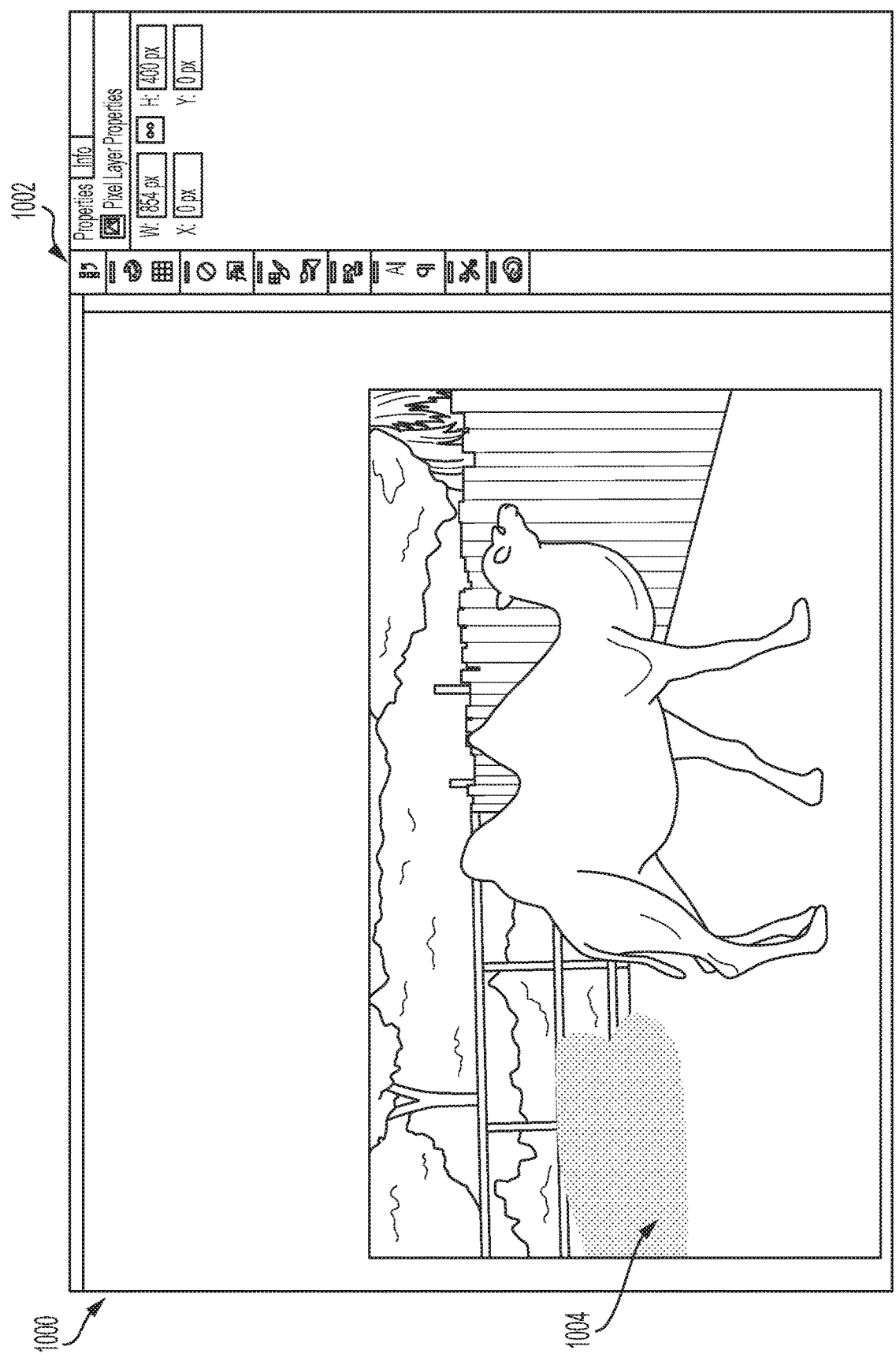
FIG. 10 depicts an example of an editing interface, which can be used in a video editor depicted in FIG. 1 or another image editing tool, for creating a user-provided reference frame, according to certain aspects of this disclosure.
Figure 11:
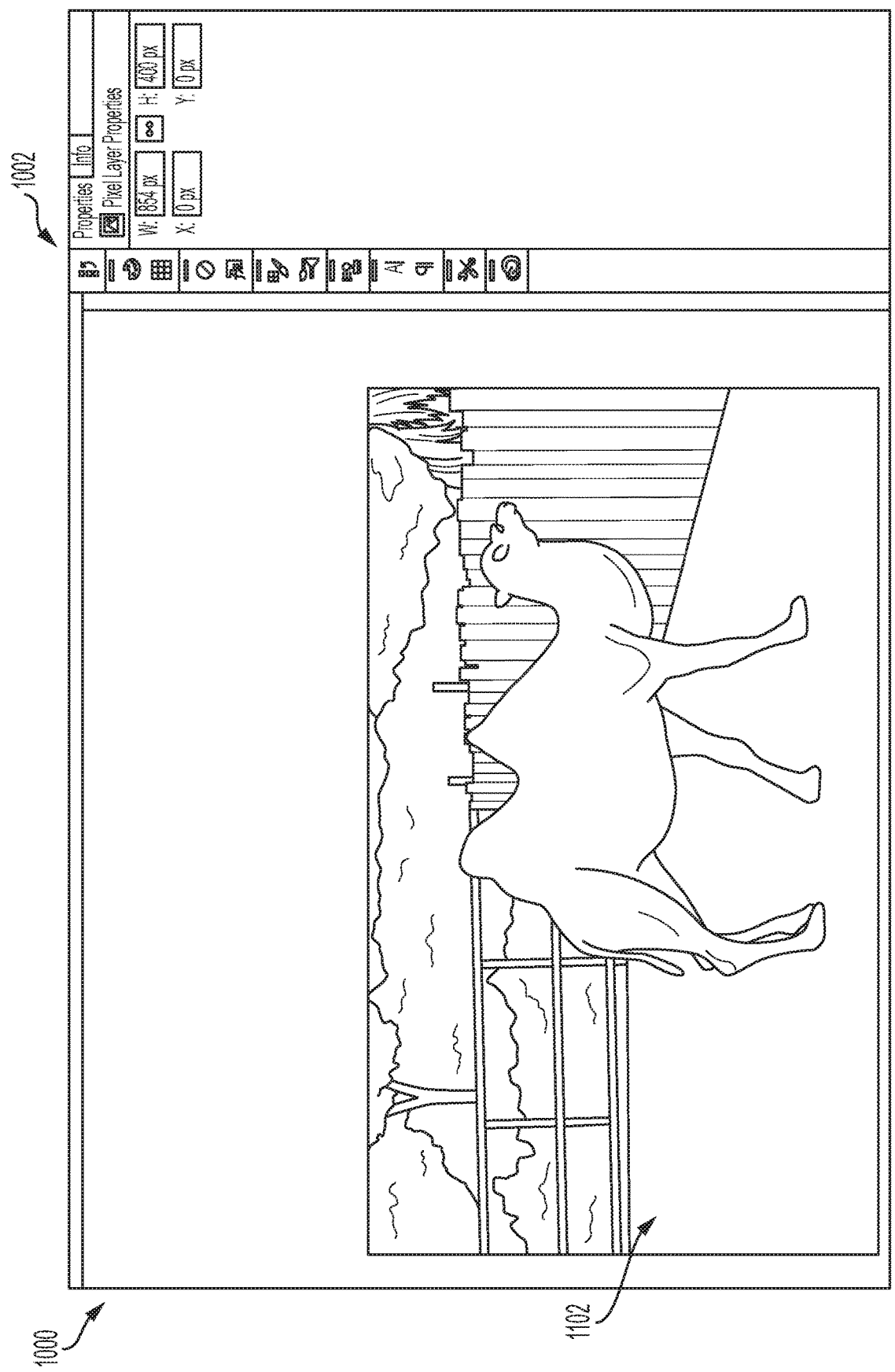
FIG. 11 depicts an example of the editing interface from FIG. 10 in which the user-provided reference frame has been created, according to certain aspects of this disclosure.

An example of such functionality is depicted in FIGS. 9-11. FIG. 9 depicts an example of a graphical interface 900, which can be used in a video editor 102 for performing video inpainting with a user-provided reference frame. The graphical interface 900 includes a preview pane 902 in which one or more frames of a video can be displayed. In this example, the frame displayed in the preview pane 902 includes a target region 906, where a rock is depicted in the target region 906.

The video editor 102 can be used to modify the frame displayed in the preview pane 902 and thereby generate a reference frame. For instance, a user input can be received on a command element 904. The command element 904 can be a button, a drop-down menu, or any interface element that causes the video editor 102 to implement an image-editing function. In this example, clicking the command element 904 can cause the video editor 102 to display an editing interface.

An example of such an editing interface 1000 is depicted in FIG. 10. In this example, the video editor 102 displays a set 1002 with one or more image-editing tools. Examples of image-editing tools include differently sized brushes, erasers, mirroring tools, etc. An image-editing tool is configured to receive user input identifying one or more identifying user-specified modifications to a frame. The video editor 102 can respond to this user input by implementing a user-specified modification.

For instance, in FIG. 10, an eraser tool has been used to remove the "rock" object from the frame displayed in the editing interface 1000 and thereby leave a hole in a target region 1004. One or more additional editing tools can be used to fill the hole left by the removed "rock" object with other image content. For instance, one or more image-editing tools can be used to mirror image content depicting a "fence" object that surrounds the removed "rock object," and to fill the hole left by the removed "rock" object with the mirrored image content.

FIG. 11 depicts an example of a reference frame that has been generated with the editing interface 1000. In this example, a modified target region 1102 includes user-generated image content depicting a portion of a fence. This user generated image content includes reference pixels, which can be used in the manner described above with respect to the examples of FIGS. 3-8.

For illustrative purposes, the example of FIGS. 9-11 is described using an image-editing tool within a video editor. But other implementation are possible. For instance, in additional or alternative aspects, the video editor 102 includes functionality that allows a user to insert the reference frame 110 from an external storage location. To do so, the user can use a software tool other than the video editor, such as a dedicated image-editing application, to modify an image and thereby implement the user-specified modification in block 804. Such an image-editing application can utilize any suitable editing interface. For instance, an editing interface similar to the editing interface 1000 described above can be implemented in a dedicated image-editing tool rather than (or in addition to) being implemented in the video editor 102.

The video editor 102 can be used to retrieve the image that has been modified by a dedicated image-editing application or other software tool. For instance, the video editor 102 can include program code that, when executed, presents an interface for adding a reference frame to a scene being edited by a user. The interface can include an upload tool. The upload tool can include one or more interface elements (e.g., a text field, a drag-and-drop field, etc.) that allow a user to specify a location of an image file. The video editor 102 can receive, via the upload tool, user input that identifies the location of the image file. The video editor 102 can retrieve the image file from the identified location. The video editor 102 can select image content from the retrieved image file as the reference frame at block 804.

Example of positioning reference frame to reduce accumulation of inpainting error For illustrative purposes, the examples described above with respect to FIGS. 1-11 describe positioning a reference frame prior to other frames in a video. But other implementations are possible. For instance, FIG. 12 depicts an example in which a set of video frames 1204a-n, which depicts a scene over time, includes a first subset of frames 1204a-j and a second subset of video frames 1204k-n.

In this example, a reference frame 1206 is positioned between the video frames 1204j and 1204k. The video editor 102 can apply a first inpainting operation 1208 to the first subset of video frames and the reference frame 1206. The video editor 102 can apply a second inpainting operation 1210 to the first subset of video frames and the reference frame 1206. For instance, operations of blocks 802-808 in the process 800 can be used to compute estimated motion through the set of video frames 1204a-n and to insert the reference frame 1206. In the first inpainting operation 1208, operations for block 810 of the process 800 can be applied to the subset of video frames 1204a-j and the reference frame 1206. In the second inpainting operation 1210, operations for block 810 of the process 800 can be applied to the subset of video frames 1204k-n and the reference frame 1206.

Figure 12:
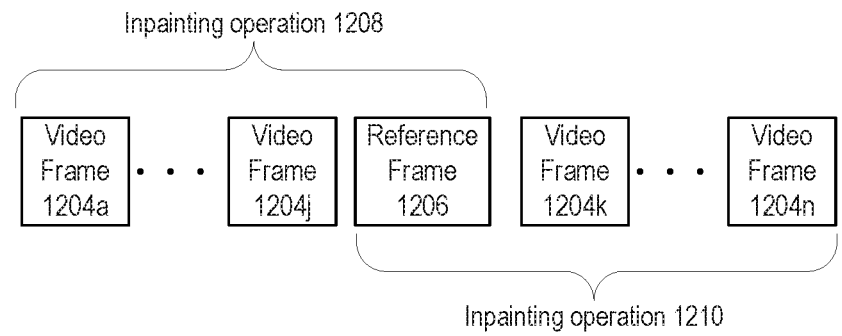
FIG. 12 depicts an example in which a reference frame is positioned between a first subset of frames depicting a scene and second subset of frames depicting the scene for performing video inpainting of the scene, according to certain aspects of this disclosure.

The example depicted in FIG. 12 can allow color data of one or more target pixels in a video frame 1204k to be updated with reference color data rather than color data obtained from one or more of the video frames 1204a-j (e.g., updated color information generated by the inpainting operation 1208). Doing so can reduce accumulation in error that might otherwise occur if a single inpainting operation propagated color information starting at the video frame 1204a and continuing through the video frame 1204n. In one example, if errors in motion estimation lead to errors in updating and propagating color information, the error from frame 25 out of 100 frames will accumulate over the next 75 frames.

Placing a reference frame between frame 25 and frame 100 can reduce this accumulation of error. For instance, reference color information can be propagated from the reference frame to frame 25 and backward, can be propagated from the reference frame to frame 25 and forward, or both. Thus, the color propagation is split into two separate inpainting operations, each of which is being applied to a smaller subset of frames (e.g., 25 frames and 75 frames) rather than a full set of 100 frames. These separate inpainting operations on smaller subsets of frames reduce the number of frames in which any given error can accumulate. Therefore, errors in propagating color information throughout the video are reduced in the example depicted in FIG. 12.

Examples using confidence values associated with motion estimation

Any suitable motion-interpolation process may be used in the process 800 or other inpainting operations described herein. In some aspects, the interpolation engine 104 interpolates position differences (i.e., motion) along a boundary between corresponding pixels of a next video frame in a sequence (e.g., frame n+1) and a current video frame in the sequence (e.g., frame n). The position difference can be interpolated from the boundary throughout other portions of the target region (e.g., a hole), such as from the boundary to the inner portion of the target region. In other words, the position differences (i.e., motion) determined for pixels along the boundary are used to propagate position changes (i.e., motion) through the target region (e.g., inward).

For instance, the interpolation engine 104 recursively down samples or collapses the target region by a sampling factor (e.g., 2) to produce a plurality of down sampled portions. Initially, the set of motion data associated with the pixels of the target region can be designated as motion data associated with level 0. As described, the set of motion data for a pixel may include position difference (i.e. motion) components and a direction indicator. For instance, an example set of initial motion data for a pixel position may be {dx, dy, 1} or {dx, dy, −1}, where dx represents a difference in the x coordinate value, dy represents a difference in the y coordinate value, 1 represents forward flow, and 0 represents the absence of motion. The function for the original or level 0 target region with position difference (i.e., motion) components and a direction indicator can be described as follows:

pyramid_level[0]= if (on_border) $c \times (x_{n+1}-x_n, y_{n+1}-y_n, 1)$ else (0, 0, 0)

In this example, the position differences are computed based on the boundary pixel position in the next video frame color minus the boundary pixel position in the current video frame (e.g., $x_{n+1}-y_n$, $y_{n+1}-y_n$), weighted by a confidence c.

The original target region, as represented by position difference (i.e., motion) components and a direction indicator, can be down sampled by a factor, such as two, to produce a first down sampled image that is a portion (e.g., half) of the resolution of the original target region. As can be appreciated, in down sampling, direction indicators are generated for pixels of the first down sampled image. By way of example only, assume that a set of four pixels is being reduced to one pixel. Further assume that three of the four pixels do not correspond with a boundary and, as such, include a zero-value direction indicator and that one of the four pixels does correspond with a boundary and, as such, includes a one-value direction indicator. In such a case, the direction indicators are aggregated or averaged to derive a direction indicator of 0.25 for the pixel in the down sampled image. The computed direction indicator of 0.25 indicates the number of pixels with position difference (i.e., motion) information that were used to compute the value (e.g., 25% of pixels used to compute results include some position difference (i.e., motion) information).

In accordance with generating each of the new direction indicators for the various pixel positions of the first down sampled image, the greatest or largest direction indicator value can be identified. In this manner, the value associated with the largest amount of position difference (i.e., motion) information available on the particular down sampled level (e.g., the first down sampled image) is identified. For each pixel of the first down sampled image, the position difference (i.e., motion) values (e.g., x and y coordinate values) and the direction indicators can then be divided by the greatest direction indicator value. Such a process renormalizes the data in accordance with the maximum indication of position difference (i.e., motion) information.

In implementations that use confidence-based motion estimation, as in the example above, a video editor 102 can include a confidence engine that computes a confidence ($B_i$) for each of the boundary pixels $B_1 \ldots B_k$. The confidence engine includes program code that, when executed by processing hardware, performs one or more operations for computing one or more measures of confidence in motion estimations performed by the video editor 102. In some aspects, the confidence c can be a combined confidence value, denoted confidence ($B_i$) in the examples below, for the ith boundary pixel ($B_i$) that is computed from a combination of a consistency component and a texture component. One example of a formula for the combined confidence value is confidence($B_i$)=consistency(i)*texture(i). In other aspects, the confidence engine computes a confidence value confidence($B_i$) for the ith boundary pixel ($B_i$1) from a consistency component without a texture component. Examples of a formula for such a confidence value are confidence($B_i$)=consistency(i) and confidence($B_i$)=g(consistency(i)), where g is some function that uses the consistency component as an input. In other aspects, the confidence engine computes a confidence value confidence($B_i$) for the ith boundary pixel ($B_i$) from a texture component without a consistency component. Examples of a formula for such a confidence value are confidence($B_i$)=texture(i) and confidence($B_i$)=g (texture(i), where g is some function that uses the texture component as an input.

In some aspects, the confidence value is computed, at least in part, based on a consistency component. For a given pair of video frames from a set of video frames 112a-112n, the confidence engine computes a forward optical flow and a backward optical flow of the particular boundary pixel with respect to the first video frame and the second video frame. An increase in the difference between the forward optical flow and the backward optical flow corresponds to a decrease in the particular confidence value. The confidence engine applies a sigmoidal function to a difference between the forward optical flow and the backward optical flow.

In one example, the confidence engine computes a consistency component from the agreement (or lack thereof) between the forward flow U at time n and backward flow V at time n+1. For instance, the confidence engine computes the difference between the forward optical flow and the backward optical flow by computing a distance from an observed position of the pixel in the first video frame and an estimated position of pixel computed by (i) applying the forward optical flow from the first video frame to the second video frame and (ii) applying the backward optical flow from the second video frame to the first video frame. To do so, the confidence engine can compute the forward flow $U(x_i, y_i, n)$=(dx,dy,1). The confidence engine indexes this forward flow into the backward flow $V(x_i+dx,y_i+dx, n+1)$= ($\widetilde{dx}$, $\widetilde{dy}$,−1). The confidence engine 108 can use this backward flow to compute a position in the frame at time n as ($\hat{x}_i$, $\hat{y}_i$)=($x_i$+dx+$\widetilde{dx}$, $y_i$+dy+$\widetilde{dy}$). If the flow is perfectly consistent, then dx=−$\widetilde{dx}$ and dy=−$\widetilde{dy}$, i.e., the forward and backward flow are opposite. If the dx≠−$\widetilde{dx}$ and/or dy≠−$\widetilde{dy}$, then the flow is less reliable. To compute a consistency component of a confidence value, the confidence engine can apply a sigmoidal function:

$$\epsilon_i \sqrt{(dx+\overline{dx})^2+(dy+\overline{dy})^2}$$

$$consistency(i) = e^{(-\epsilon_i^2/\sigma_c^2)}$$

In this example, the term $\epsilon_i$ is the distance (in pixels) between the starting pixel, and the round-trip location after following forward and backward flow, and $\sigma_c$ controls the shape of the energy function. In one example, $\sigma_c$=0.5.

In some aspects, a particular confidence value for a boundary pixel includes the output of the sigmoidal function (e.g., if consistency alone is used to compute confidence). In additional or alternative aspects, a particular confidence value for a boundary pixel is derived from the output of the sigmoidal function (e.g., if a consistency component is combined with some other component to compute confidence). For instance, deriving the particular confidence value from the output of the sigmoidal function could include multiplying the output of the sigmoidal function by a texture-based confidence computed from the texture in a window region that includes a particular boundary pixel and certain surrounding pixels.

In additional or alternative aspects, the confidence value is computed, at least in part, based on a texture component. In one example, the confidence engine determines the texture component based on a variance in the grayscale intensity values in a specified window region around each boundary pixel. An increase in the texture corresponds to an increase in the particular confidence value. For instance, if a block of pixels all have the same color, then there is no texture and no variance in appearance. A lack of texture or low amount of texture (i.e., little or no variance in grayscale intensity values) indicates that the flow is unreliable.

In one example, the variance of intensity values in the region comprises a summation of intensity differences, where each intensity difference is a difference between a grayscale intensity of a respective pixel in the region and an average grayscale intensity of the region. For instance, for a given window region having radius w, the confidence engine can compute the variance of the intensity values around a given pixel boundary pixel i:

$$variance_i^2 = \frac{\sum_{u=-w}^{w}\sum_{v=-w}^{w} G((x_i+u, y_i+v, n)) - \mu}{2*w+1}$$

$$texture(i) = e^{\{variance_i^2/\sigma_t^2\}}$$

In this example, $\mu$ is the average grayscale intensity in the window, G (x, y, n) is the grayscale intensity at position (x, y) and time n, and $\sigma_t$ controls the shape of the energy function. In one example, $\sigma_t$=0.125 (grayscale values are between 0.0 and 1.0) and w=4, leading to a 9×9 pixel window.

The example provided above involves a forward texture component for computing confidence values, where the motion field for a given frame n is computed using confidence values that are generated, at least in part, by analyzing the texture in the frame n. In additional or alternative aspects, a backward texture component is used for computing confidence values. In these aspects, the confidence engine can compute the backward texture component by using grayscale intensity values in frame n+1. Thus, the motion field for a given frame n is computed using confidence values that are generated, at least in part, by a backward texture component corresponding to the texture in the frame n+1.

Figure 13:
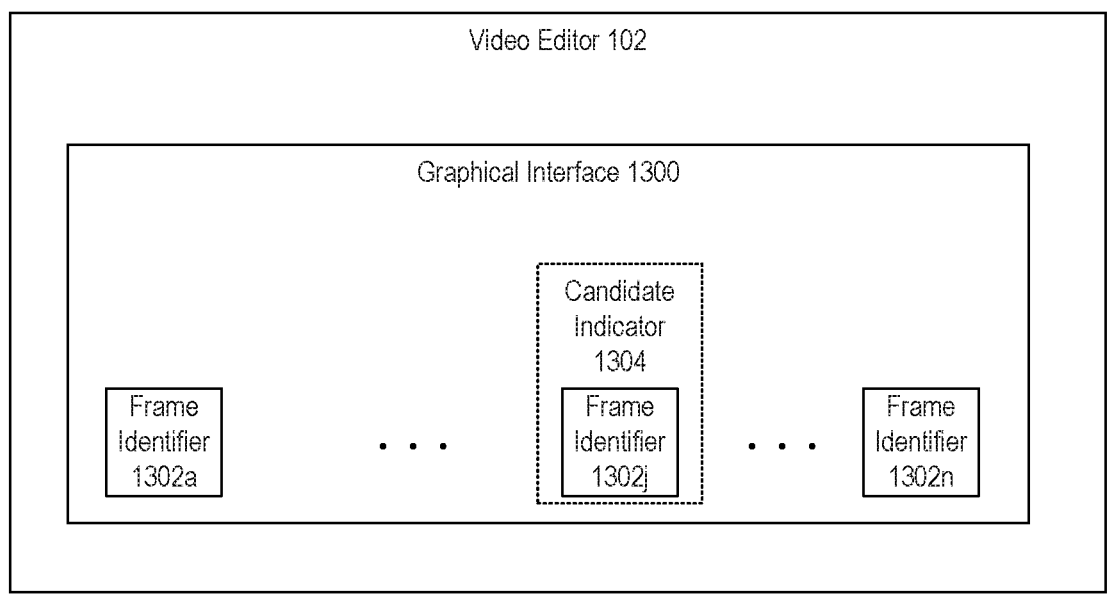
FIG. 13 depicts an example of an interface that can be used in a video editor depicted in FIG. 1 for identifying one or more candidate frames to be modified for generating a reference frame, according to certain aspects of this disclosure.

In some aspects, one or more confidence values described above can be used by the video editor 102 to suggest, to a user, which of the video frames depicting a scene should be manually edited to create a reference frame. For instance, FIG. 13 depicts an example of a graphical interface 1300. The graphical interface 1300 generated by and used in a video editor 102. In this example, the graphical interface 1300 includes frame identifiers 1302a-n. Each of the frame identifiers 1302a-n identifies a respective video frame from a video. Examples of the frame identifiers include points along a timeline for a video (e.g., a one-minute mark, a two-minute mark, etc.), thumbnail images from the video (e.g., low-resolution versions of different frames in the video), etc. In some aspects, the frame identifiers 1302a-n are navigable interface elements that allow a user to navigate to particular video frames. For instance, a frame identifier could be a graphical element with an event listener, where the event listener is configured to receive certain user inputs (e.g., mouse clicks, taps, etc.) that trigger a navigation function executed by the video editor 102 (e.g., updating a preview interface to depict a particular video frame corresponding to a particular video frame identifier).

The graphical interface 1300 can be used to identify one or more candidate frames to be modified for generating a reference frame. For instance, as discussed in the example above, various confidence values (e.g., confidence ($B_i$)) can be computed for frames in a video. The video editor 102 can update the graphical interface 1300 to display one or more candidate indicators on or near video frames associated with lower confidence values. For instance, in the example depicted in FIG. 1300, the frame identifier 1302j can identify a video frame that is associated with a lower confidence value. The video editor 102 can update the graphical interface 1300 to depict a candidate indicator 1304 at or near the frame identifier 1302j. Examples of the candidate indicator 1304 include modifying a color of the frame identifier 1302j (e.g., recoloring a tick mark in a timeline or a border of a thumbnail image), adding an additional graphical element (e.g., adding an arrow pointing to a certain point along a timeline), or any other change to a visual feature of the graphical interface to identify a candidate for a reference frame.

A frame can be associated with a lower confidence value if, for example, a confidence value generated using the frame is less than a threshold confidence, a user-specified confidence value received via one or more user interfaces of the video editor 102. In some aspects, a confidence value being less than a threshold can involve a combined confidence value being less than a threshold. For instance, a set of confidence values for i boundary pixels (e.g., confidence ($B_i$)) can be computed from a pair of frames that includes a particular frame. If a total confidence value, such as the sum of the confidence values or a normalized version of that sum, is less than a threshold, then the video editor 102 can identify the particular frame using a candidate indicator. In additional or alternative aspects, a confidence value being less than a threshold can involve one or more individual confidence values being less than a threshold. For instance, a set of confidence values for i boundary pixels (e.g., confidence ($B_i$)) can be computed from a pair of frames that includes a particular frame. If at least one of these confidence values is less than a threshold, then the video editor 102 can identify the particular frame using a candidate indicator, even if a total confidence value computed from multiple confidence values in the set exceeds the threshold.

Example of a Computing System for Implementing Certain Aspects

Figure 14:
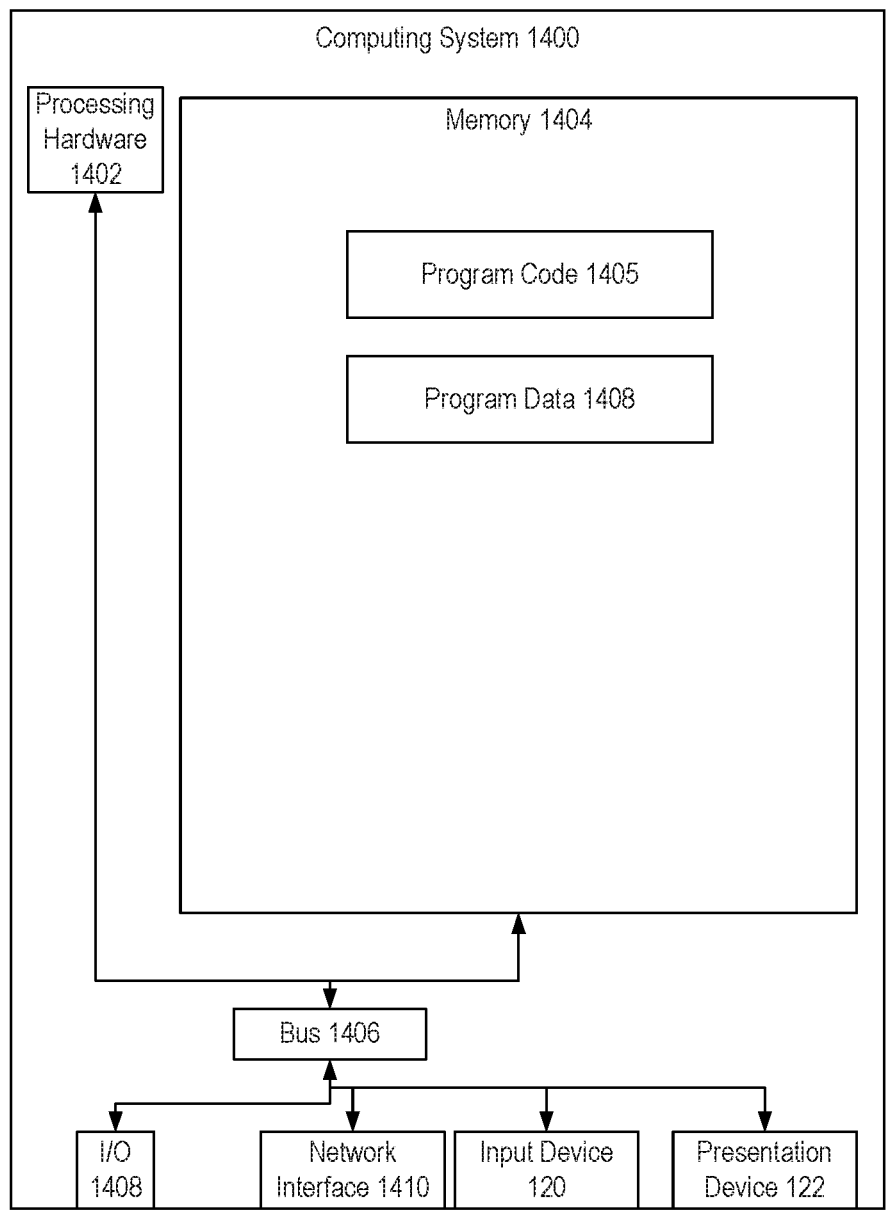
FIG. 14 depicts an example of a computing system for implementing one or more aspects of this disclosure.

Any suitable computing system or group of computing systems can be used for performing the operations described herein. For example, FIG. 14 depicts an example of a computing system 1400. In some aspects, the computing system 1400 includes processing hardware 1402 that executes program code 1405 (e.g., the video editor 102, the interpolation engine 104, the color update engine 106, etc.), a memory device 1404 that stores one or more sets of program data 1407 computed or used by operations in the program code 1405 (e.g., a set of input video frames, annotations identifying target regions, motion fields, a set of edited video frames, etc.), one or more input devices 120, and one or more presentation devices 122 for displaying graphical content generated by executing the program code 1405. For illustrative purposes, FIG. 14 depicts a single computing system on which the program code 1405 is executed, the program data 1407 is stored, and the input devices 120 and presentation device 1414 are present. But various applications, datasets, and devices described can be stored or included across different computing systems having devices similar to the devices depicted in FIG. 14.

The depicted example of a computing system 1400 includes processing hardware 1402 communicatively coupled to one or more memory devices 1404. The processing hardware 1402 executes computer-executable program code stored in a memory device 1404, accesses information stored in the memory device 1404, or both. Examples of the processing hardware 1402 include a microprocessor, an application-specific integrated circuit ("ASIC"), a field-programmable gate array ("FPGA"), or any other suitable processing device. The processing hardware 1402 can include any number of processing devices, including a single processing device.

The memory device 1404 includes any suitable non-transitory computer-readable medium for storing data, program code, or both. A computer-readable medium can include any electronic, optical, magnetic, or other storage device capable of providing a processor with computer-readable instructions or other program code 1405. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 1405 may include processor-specific instructions generated by a compiler or an interpreter from code written in any suitable computer-programming language, including, for example, C, C++, C#, Visual Basic, Java, Python, Perl, JavaScript, and ActionScript.

The computing system 1400 may also include a number of external or internal devices, such as an input device 120, a presentation device 1414, or other input or output devices. For example, the computing system 1400 is shown with one or more input/output ("I/O") interfaces 1408. An I/O interface 1408 can receive input from input devices or provide output to output devices. One or more buses 1406 are also included in the computing system 1400. The bus 1406 communicatively couples one or more components of a respective one of the computing system 1400.

The computing system 1400 executes program code 1405 that configures the processing hardware 1402 to perform one or more of the operations described herein. The program code 1405 includes, for example, the video editor 102, the interpolation engine 104, the color update engine 106, or other suitable program code that performs one or more operations described herein. The program code 1405 may be resident in the memory device 1404 or any suitable computer-readable medium and may be executed by the processing hardware 1402 or any other suitable processor. The program code 1405 uses or generates program data 1407. Examples of the program data 1407 include one or more of the memory frames, ground truth frames, feature-classification data, feature-selection data, key or value maps, etc. described herein with respect to FIGS. 1-7.

In some aspects, the computing system 1400 also includes a network interface device 1410. The network interface device 1410 includes any device or group of devices suitable for establishing a wired or wireless data connection to one or more data networks. Non-limiting examples of the network interface device 1410 include an Ethernet network adapter, a modem, and/or the like. The computing system 1400 is able to communicate with one or more other computing devices via a data network using the network interface device 1410.

An input device 120 can include any device or group of devices suitable for receiving visual, auditory, or other suitable input that controls or affects the operations of the processing hardware 1402. Non-limiting examples of the input device 120 include a recording device, a touchscreen, a mouse, a keyboard, a microphone, a video camera, a separate mobile computing device, etc. A presentation device 1414 can include any device or group of devices suitable for providing visual, auditory, or other suitable sensory output. Non-limiting examples of the presentation device 1414 include a touchscreen, a monitor, a separate mobile computing device, etc.

Although FIG. 14 depicts the input device 120 and the presentation device 1414 as being local to the computing device that executes the program code 1405, other implementations are possible. For instance, in some aspects, one or more of the input device 120 and the presentation device 1414 can include a remote client-computing device that communicates with the computing system 1400 via the network interface device 1410 using one or more data networks described herein.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

The invention claimed is:

1. A method in which one or more processing devices performs operations comprising:
    accessing a set of video frames comprising a first frame and a second frame having respective annotations identifying a target region to be modified, the target region including a first target pixel at a first location in the first frame and a second target pixel at a second location in the second frame;
    computing, by a video editing tool, a boundary motion for a boundary of the target region within the set of video frames, wherein the boundary includes boundary pixels neighboring the target region in the set of video frames;
    interpolating, by the video editing tool and from the boundary motion, a target motion of target pixels within the target region across the set of video frames;
    computing, by the video editing tool, confidence values for the set of video frames;
    identifying, by the video editing tool, a frame among the set of video frames with a confidence value less than a threshold confidence; and
    outputting, by the video editing tool, a suggestion to use the identified frame as a reference frame;
    modifying, responsive to user input, the identified frame to generate the reference frame;
    inserting, by the video editing tool, the reference frame into the set of video frames, the reference frame having a user-specified modification to the target region; and
    updating, by the video editing tool, color data of the target region in the set of video frames to correspond to the target motion interpolated from the boundary motion, wherein updating the color data comprises:
        identifying reference color data of a pixel at a reference location in the reference frame,
        updating first color data of the first target pixel with the reference color data, and
        updating second color data of the second target pixel with the updated first color data.

2. The method of claim 1, wherein interpolating the target motion comprises estimating a change in position of a target object between the first frame and the second frame, wherein the change in position corresponds to a portion of the boundary motion between the first frame and the second frame, wherein the first target pixel and the second target pixel depict the same portion of the target object in the first frame and the second frame.

3. The method of claim 2, further comprising computing the second location in the second frame by modifying the first location according to the change in position of the target object between the first frame and the second frame.

4. The method of claim 1, wherein the set of video frames comprises a subset of frames that (a) lacks the first frame and the second frame and (b) includes an additional frame that is positioned, in a sequence of the set of video frames, before the first frame and the second frame and that has an additional target pixel at an additional location,
    wherein updating the color data of the target region in the set of video frames further comprises updating additional color data of the additional target pixel with prior color data from a prior frame in the subset of frames that is positioned before the additional frame in the sequence of the set of video frames,
    wherein the first color data of the first target pixel is updated with the reference color data rather than the updated additional color data.

5. The method of claim 1, wherein modifying the identified frame to generate the reference frame comprises:
    presenting, in an editing interface of the video editing tool, a preview pane that plays the set of video frames;
    displaying, via the preview pane, the identified frame;
    receiving editing inputs identifying the user-specified modification;
    modifying the identified frame by applying the user-specified modification to the target region in the identified frame; and
    selecting the modified identified frame as the reference frame.

6. The method of claim 1, further comprising:
    presenting, in an editing interface of the video editing tool, an upload tool;
    receiving, by the upload tool, input identifying a location of an image file;
    retrieving the image file from the location; and
    selecting image content from the image file as an additional reference frame.

7. The method of claim 1, wherein the user-specified modification to the target region comprises a removal, from the target region, of a first object displayed in the target region in the first frame and the second frame and a replacement of the first object with a second object.

8. A non-transitory computer-readable medium having program code of a video editing tool stored thereon, wherein the program code, when executed by one or more processing devices, configures the one or more processing devices to perform operations comprising:
    accessing a set of video frames comprising a first frame and a second frame having respective annotations identifying a target region to be modified, the target region including a first target pixel at a first location in the first frame and a second target pixel at a second location in the second frame;

interpolating, by the video editing tool and from a motion of a boundary of the target region within the set of video frames, a target motion of target pixels within the target region across the set of video frames;

computing, by the video editing tool, confidence values for the set of video frames;

identifying, by the video editing tool, a frame among the set of video frames with a confidence value less than a threshold confidence; and outputting, by the video editing tool, a suggestion to use the identified frame as a reference frame;

generating the reference frame by at least applying, to the identified frame, a user-specified modification to the target region; and updating, based on reference color data from the user-specified modification, color data of the target region in the set of video frames to correspond to the target motion as interpolated.

9. The non-transitory computer-readable medium of claim 8, wherein interpolating the target motion comprises estimating a change in position of a target object between the first frame and the second frame, wherein the change in position corresponds to a portion of the motion of the boundary between the first frame and the second frame, wherein the first target pixel and the second target pixel depict the same portion of the target object in the first frame and the second frame.

10. The non-transitory computer-readable medium of claim 9, the operations further comprising computing the second location in the second frame by modifying the first location according to the change in position of the target object between the first frame and the second frame.

11. The non-transitory computer-readable medium of claim 8, wherein updating the color data comprises:
identifying the reference color data from a pixel at a reference location in the reference frame,
updating first color data of the first target pixel with the reference color data, and
updating second color data of the second target pixel with the updated first color data, wherein the set of video frames comprises a subset of frames that (a) lacks the first frame and the second frame and (b) includes an additional frame that is positioned, in a sequence of the set of video frames, before the first frame and the second frame and that has an additional target pixel at an additional location, wherein updating the color data of the target region in the set of video frames further comprises updating additional color data of the additional target pixel with prior color data from a prior frame in the subset of frames that is positioned before the additional frame in the sequence of the set of video frames, wherein the first color data of the first target pixel is updated with the reference color data rather than the updated additional color data.

12. The non-transitory computer-readable medium of claim 8, wherein generating the reference frame comprises:
presenting, in an editing interface of the video editing tool, a preview pane that plays the set of video frames;
displaying, via the preview pane, the identified frame from the set of video frames;
receiving editing inputs identifying the user-specified modification;
modifying the identified frame by applying the user-specified modification to the target region in the identified frame; and selecting the modified identified frame as the reference frame.

13. The non-transitory computer-readable medium of claim 8, the operations further comprising:
presenting, in an editing interface of the video editing tool, an upload tool;
receiving, by the upload tool, input identifying a location of an image file;
retrieving the image file from the location; and
selecting image content from the image file as an additional reference frame.

14. The non-transitory computer-readable medium of claim 8, wherein the user-specified modification to the target region comprises a removal, from the target region, of a first object displayed in the target region in the first frame and the second frame and a replacement of the first object with a second object.

15. A computing system comprising:
a processing device; and
a non-transitory computer-readable medium communicatively coupled to the processing device and storing program code,
wherein the processing device is configured for executing the program code and thereby performing operations comprising:
accessing a set of video frames comprising a first frame and a second frame having respective annotations identifying a target region, the target region including a first target pixel at a first location in the first frame and a second target pixel at a second location in the second frame,
identifying a target motion of the target region across the set of video frames,
computing confidence values associated with the target motion for the set of video frames;
identifying a frame among the set of video frames with a confidence value less than a threshold confidence; and
outputting a suggestion to use the identified frame as a reference frame;
inserting, responsive to user input, the reference frame into the set of video frames, the reference frame comprising the identified frame modified by a user-specified modification to the target region, and
updating color data of the target region in the set of video frames to correspond to the target motion interpolated from a boundary motion, wherein updating the color data comprises:
identifying reference color data of a pixel at a reference location in the reference frame,
updating first color data of the first target pixel with the reference color data, and
updating second color data of the second target pixel with the updated first color data.

16. The computing system of claim 15, the operations further comprising:
computing a boundary motion for a boundary of the target region within the set of video frames, wherein the boundary includes boundary pixels neighboring the target region in the set of video frames;
interpolating the target motion of target pixels from the boundary motion.

17. The computing system of claim 16, wherein interpolating the target motion comprises estimating a change in position of a target object between the first frame and the second frame, wherein the change in position corresponds to a portion of the boundary motion between the first frame and the second frame, wherein the first target pixel and the second target pixel depict the same portion of the target object in the first frame and the second frame.

18. The computing system of claim 15, wherein the set of video frames comprises a subset of frames that (a) lacks the first frame and the second frame and (b) includes an additional frame that is positioned, in a sequence of the set of video frames, before the first frame and the second frame and that has an additional target pixel at an additional location, wherein updating the color data of the target region in the set of video frames further comprises updating additional color data of the additional target pixel with prior color data from a prior frame in the subset of frames that is positioned before the additional frame in the sequence of the set of video frames, wherein the first color data of the first target pixel is updated with the reference color data rather than the updated additional color data.

19. The computing system of claim 15, wherein inserting the reference frame comprises:

updating an editing interface of a video editing tool to display a preview pane that plays the set of video frames;

updating the preview pane to display the identified frame from the set of video frames;

receiving editing inputs identifying the user-specified modification;

modifying the identified frame by applying the user-specified modification to the target region in the identified frame; and selecting the modified identified frame as the reference frame.

20. The computing system of claim 15, the operations further comprising:

updating an editing interface of a video editing tool to display an upload tool;

receiving, via the upload tool, input identifying a location of an image file;

retrieving the image file from the location; and selecting image content from the image file as an additional reference frame.

* * * * *